United States Patent [19]
Yacenda et al.

[11] Patent Number: 5,515,426
[45] Date of Patent: May 7, 1996

[54] TELEPHONE COMMUNICATION SYSTEM HAVING A LOCATOR

[75] Inventors: Michael W. Yacenda, Stamford; John Chaco, Seymour; Ram Yaron, Stamford, all of Conn.

[73] Assignee: Executone Information Systems, Inc., Milford, Conn.

[21] Appl. No.: 369,184

[22] Filed: Jan. 5, 1995

Related U.S. Application Data

[63] Continuation-in-part of Ser. No. 203,340, Feb. 28, 1994, abandoned.

[51] Int. Cl.[6] .................................................. H04M 3/42
[52] U.S. Cl. ........................... 379/201; 379/57; 379/58; 379/142; 379/106; 250/338.1; 455/73
[58] Field of Search .............................. 379/57, 104, 58, 379/201, 210, 211, 59, 67, 88, 89, 106, 142; 250/338.1, 338.2, 338.3, 338.4, 353; 540/539, 531; 455/34.1, 73, 606, 607; 364/419.2, 419; 340/573, 539

[56] References Cited

U.S. PATENT DOCUMENTS

| | | | |
|---|---|---|---|
| 3,696,384 | 10/1972 | Lester | 340/312 |
| 3,739,329 | 6/1973 | Lester | 340/16 R |
| 3,805,227 | 4/1974 | Lester | 340/16 R |
| 3,805,265 | 4/1974 | Lester | 343/6.5 R |
| 4,275,385 | 6/1981 | White . | |
| 4,553,267 | 11/1985 | Crimmins | 455/606 |
| 4,601,064 | 7/1986 | Shipley . | |
| 4,649,385 | 3/1987 | Aires et al. | 379/57 |
| 4,680,785 | 7/1987 | Akiyama et al. . | |
| 4,752,951 | 6/1988 | Konneker . | |
| 4,757,553 | 7/1988 | Crimmins | 455/607 |
| 4,835,372 | 5/1989 | Gombrich et al. . | |
| 4,899,373 | 2/1990 | Lee et al. . | |
| 4,906,853 | 3/1990 | Linwood et al. . | |
| 4,916,441 | 4/1990 | Gombrich . | |
| 4,940,963 | 7/1990 | Gutman et al. . | |
| 4,955,000 | 9/1990 | Nastrom . | |
| 4,977,619 | 12/1990 | Crimmins . | |
| 5,086,394 | 2/1992 | Shapira | 364/419 |
| 5,103,108 | 4/1992 | Crimmins | 250/338.1 |
| 5,119,104 | 6/1992 | Heller . | |
| 5,140,626 | 8/1992 | Ory et al. . | |
| 5,148,148 | 9/1992 | Shima et al. | 340/539 |
| 5,164,985 | 11/1992 | Nysen et al. . | |
| 5,204,670 | 4/1993 | Stinton . | |
| 5,291,399 | 3/1994 | Chaco . | |
| 5,363,425 | 11/1994 | Mufti et al. | 379/211 |
| 5,402,469 | 3/1995 | Hopper et al. | 379/211 |
| 5,432,841 | 7/1995 | Rimer | 379/59 |

FOREIGN PATENT DOCUMENTS

| | | |
|---|---|---|
| 0356125 | 2/1990 | European Pat. Off. . |
| 505627A2 | 9/1992 | European Pat. Off. . |
| 2230365 | 10/1990 | United Kingdom . |

OTHER PUBLICATIONS

INFRA-COM® "A Staff and Equipment Locating and Signaling System from United Identification Systems Corp.", Pamphlet.

INFRARED LOCATOR, Great New Product, TELECONNECT, Feb., 1986.

The Computer for the 21st Century by Mark Weiser, Scientific American, Sep. 1991.

Microsoft Press®, Computer Dictionary, Second Edition, The Comprehensive Standard For Business, School, Library, and Home.

*Primary Examiner*—Jeffery Hofsass
*Assistant Examiner*—Scott Wolinsky
*Attorney, Agent, or Firm*—Dilworth & Barrese

[57] ABSTRACT

A telephone communication system having a locator system for locating telephone users and generating location information. The telephone communication system includes a plurality of telephone functions which are user accessible for usage in conjunction with the location information. Each telephone of the system may be configured to facilitate interactive control and selection of the system features by the users.

23 Claims, 31 Drawing Sheets

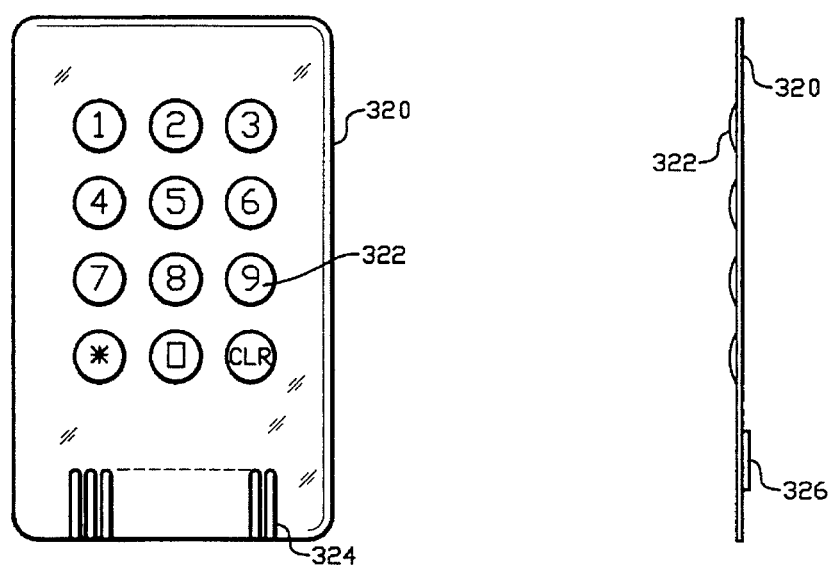
*FIG.5*   *FIG.6*
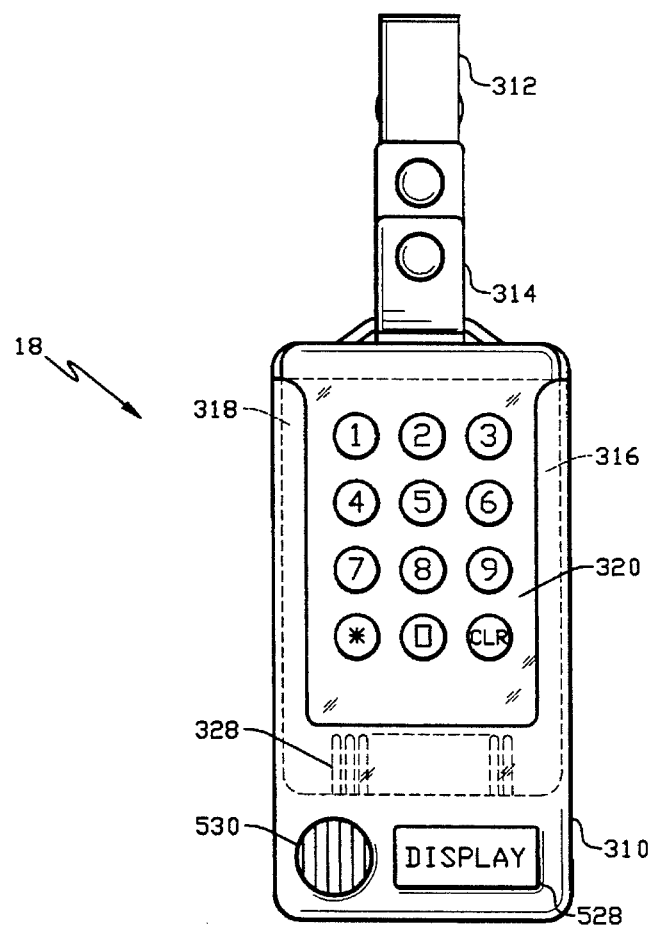
*FIG.7*

DATA FRAME FORMAT AND TIMING TO PBX

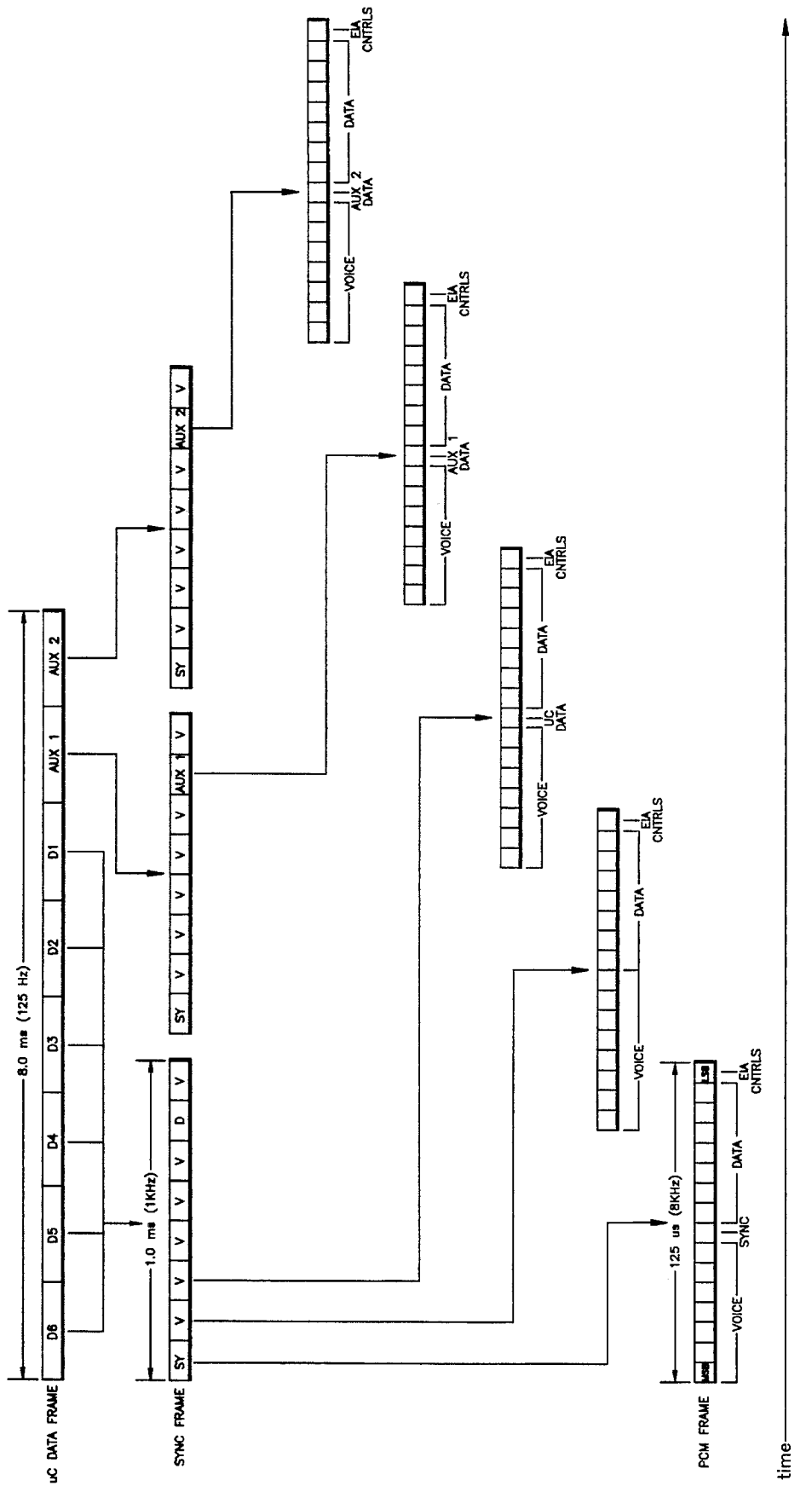
FIG. 17  DATA FRAME FORMAT AND TIMING TO TELEPHONE

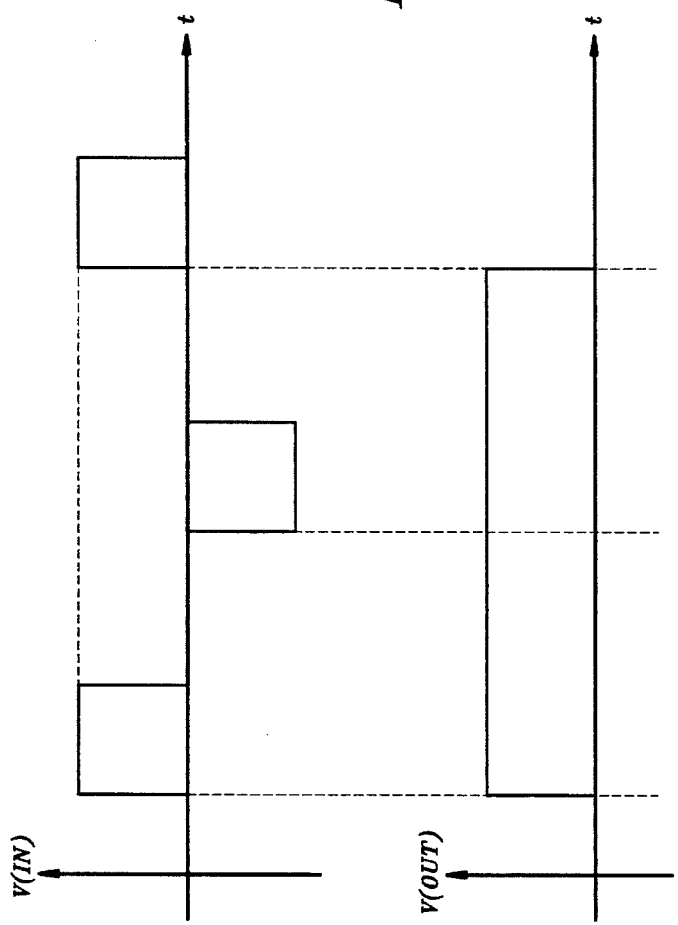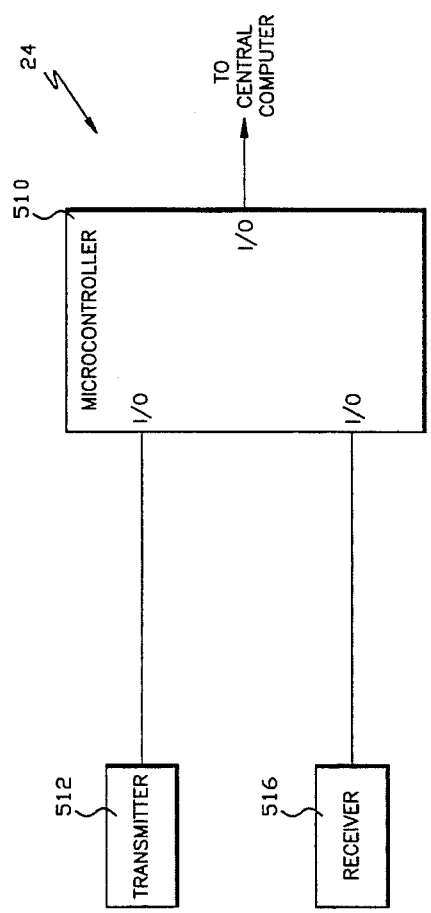

TELEPHONE COMMUNICATION SYSTEM HAVING A LOCATOR

This application is a continuation-in-part of U.S. application Ser. No. 08/203,340, filed Feb. 28, 1994, now abandoned.

FIELD OF THE INVENTION

The present invention generally relates to a telephone communication system and more particularly a telephone communication system having a PBX connected to a locator system which determines the locations of the telephone users.

BACKGROUND OF THE INVENTION

Location systems for locating objects or personnel within a facility and their use in conjunction with telephone systems have previously been proposed. Typically, location systems locate personnel or objects by seeking out where the objects or personnel are closest to designated monitors. Such systems generally include a central controller connected to a plurality of transceivers distributed at designated locations throughout a facility. Portable units are worn or attached to objects or personnel to be located. Each portable unit is assigned a unique identification. In some systems, the central controller causes the transceivers to broadcast or page the portable unit by its identification. The broadcast or page signal is received by the portable units but only the portable unit having a matching identification will respond with a confirmation signal, which is received by the transceiver located closest to the responding portable unit. The transceiver in turn reports to the central controller that it has received a confirmation signal. The location of the portable unit is determined by the central controller by the message received from the transceiver. Location systems employing such location technique are described, for example, in U.S. Pat. No. 4,649,385 to Aires et al.; and U.S. Pat. Nos. 3,805,265, 3,805,227 and 3,696,384 to Lester.

The proposed use of locator systems in conjunction with telephone systems have usually been in the form of locating the called party and automatically ringing the telephone closest to the called party. While such systems would significantly reduce the "phone tagging" problems, (i.e., the calling and called parties repeatedly calling each other without an actual conversation, which are common in office facilities), numerous problems associated with the use of telephones remains. For example, a busy called party who does not wish to answer the phone, who does not want to be disturbed or who wishes an opportunity to screen a caller, must nevertheless take the call. An automatic PBX/locator system may also be the cause of other problems, for example, the automatic routing of a call to a telephone in a conference room, causing disruption to an important meeting.

Therefore, a need exists for a telephone/locator system which provides advanced features to address the above problems and to facilitate interaction and control of the system by the users.

SUMMARY OF THE INVENTION

The present invention utilizes a PBX and a locator communication system adapted for wireless communication of information including identification information and for locating individuals. A plurality of portable badge units are associated with respective individuals and the identification information is transmitted to a central processing unit through a plurality of transceivers which are spatially dispersed throughout the facility. A private exchange may be used to determine the location of the individuals and to route telephone calls to the detected locations.

Various techniques may be employed to locate individuals and to route telephone calls for the individuals. For example, a method for locating individuals is provided which includes the steps of positioning a plurality of transceivers in a closed environment and coupling the transceivers to a central processor which in turn is coupled to a private-branch exchange. The transceivers receive transmissions from the badges and relay the information to the central processor, which in turn directs the PBX to route to the closest telephone.

Alternatively, the plurality of telephones coupled to the PBX may include wireless sensors for receiving transmissions from the badges and therefore act as transceivers. In such case, the wireless sensor is incorporated as part of the telephone circuitry which includes identification processing circuitry and telephone transmitting and receiving circuitry to transmit and receive voice and data information.

Once the badge unit information is transmitted to a telephone, the information is transferred to the private-branch exchange where it is processed to determine the location of each individual in the closed environment. After the location of an individual is determined, telephone calls may then be routed to the individual at the detected location.

According to the system and method according to the present invention, the telephone/locator system is capable of interacting with the users of the system and accepts user commands for controlling the system. For example, the locator information from the locator system may be used in conjunction with advanced telephonic functions, such as automatic callback, preprogrammed call blocking, do not disturb and auto call screening. The system is also capable of user programmed functions such as monitoring of specified location sensors and telephone conditions and the automatic actuation of devices upon the occurrence of such conditions. With the adaptability and interactive capabilities, the telephone/locator system according to the invention provides automatic or on-demand location, connection and communication information among the system users.

BRIEF DESCRIPTION OF THE DRAWINGS

Preferred embodiments of the invention are described hereinbelow with reference to the drawings wherein:

FIGS. 5 and 6 illustrate front and side elevational views of a function card according to the present invention;

FIG. 7 illustrates a top plan view of the housing of FIG. 4 having a function card inserted therein;

FIG. 17 illustrates exemplary data frames for communication from the private-branch exchange to the telephone in an expanded form;

FIG. 18 illustrates typical input and output waveshapes for the waveshaping and amplifier network of FIG. 13;

FIG. 20 is a block diagram of the components of the transceiver of FIG. 19;

DETAILED DESCRIPTION OF THE PREFERRED EMBODIMENTS

System Configuration

Figure 1:
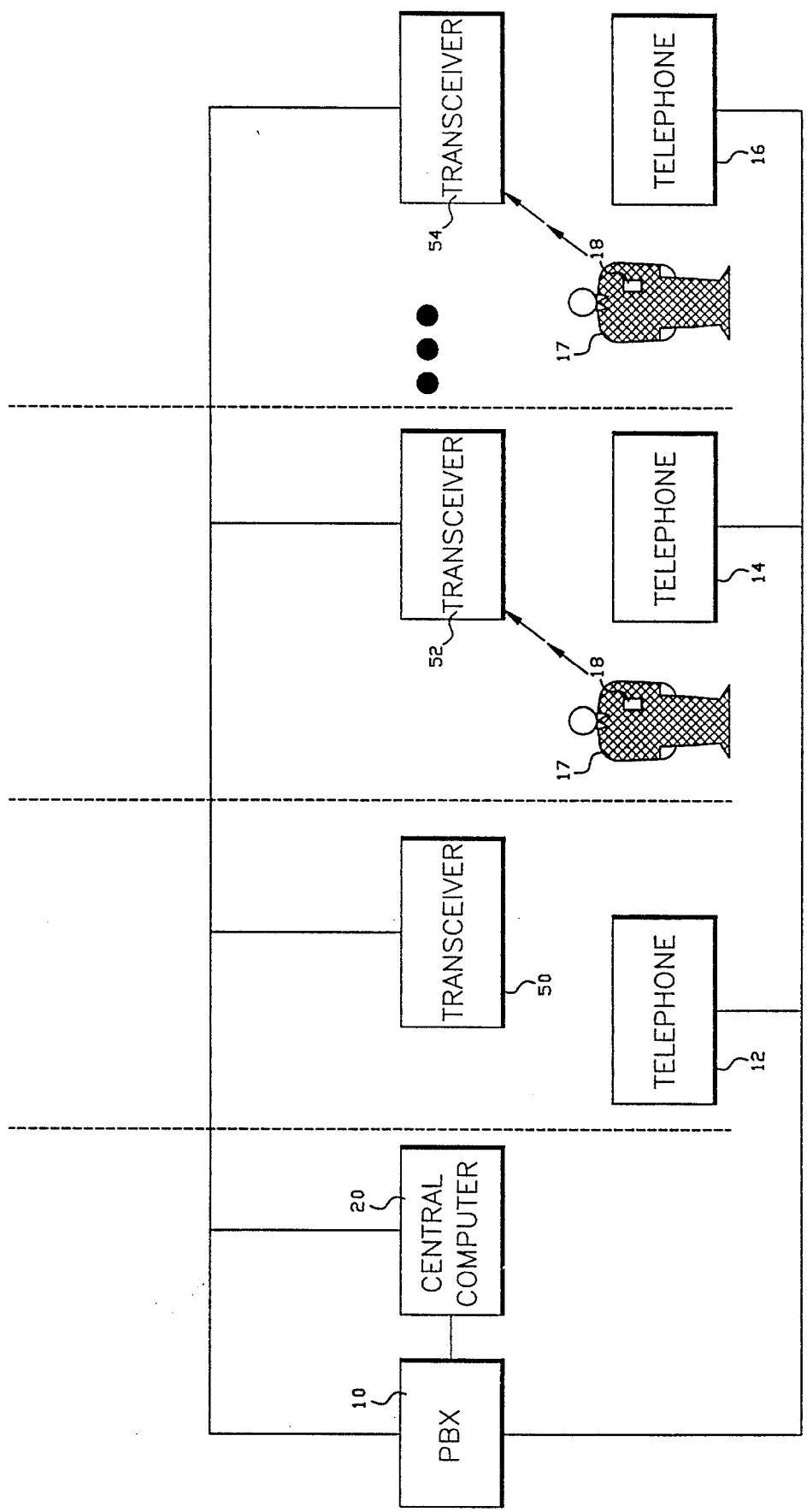
FIG. 1 illustrates the system configuration for the telephone communication system of the present invention.

FIG. 1 illustrates an exemplary embodiment for the system configuration of the present invention. As shown, PBX 10 is connected to numerous telephones, e.g., telephones 12, 14 and 16, and central computer 20 is connected to a plurality of transceivers, e.g., 50, 52 and 54, each of which includes a wireless receiver/sensor adapted to receive radiated energy from a remote transmitting device. Preferably, such receiver/sensor is adapted to receive infrared signals from the remote transmitter.

Each personnel 17 in the facility is provided with a remote transmitting device, such as badge unit 18, which periodically transmits predetermined personnel information. For the purposes of clarity in the present detailed description, the personnel information transmitted by badge 18 will be identified as badge data, and information transmitted to the badge will be identified as return badge data. Each transceiver is capable of receiving the badge data when the badge transmitters are in the transceiver's reception range. The transceiver detects, digitize and may process the received radiated energy and transfers the processed information to the central computer 20 or, alternatively, directly to the PBX 10. The PBX can then, for example, utilize the information to re-direct incoming calls for each particular person to their detected location, as noted above.

PBX 10 is connected to central computer 20 to couple the central computer to the telephones located in the facility. Central computer 20 provides standard control of PBX 10 such as processing telephone data received by the PBX and providing the PBX with the connection information to interconnect particular telephones. For example, if a telephone user ("the calling party") calls another extension connected to the PBX, central computer 20 processes the telephone data, e.g., the extension of the called party, and provides the PBX with the necessary information to interconnect the two telephones. In addition central computer 20 is utilized to process the information received from the remote badges, such as determining the identity of the person associated with the respective badge. Central computer 20 may also be utilized to update the display of the calling party's telephone with the location information of the called party. Alternatively, the components and functions of central computer 20 may be incorporated within PBX 10, and all the functions of central computer 20 can be performed by the PBX 10. The PBX 10 includes a processing unit (not shown), stored programs and means for facilitating telephone functions such as special ring tones, callback, caller ID, call blocking, do not disturb, call forwarding, camp-on, voice-mail, etc. Implementation of these functions are known to one skilled in the telephone art. Preferably, PBX 10 is a model IDS-228, commercially available from EXECUTONE Information Systems, Inc.

Figure 2:
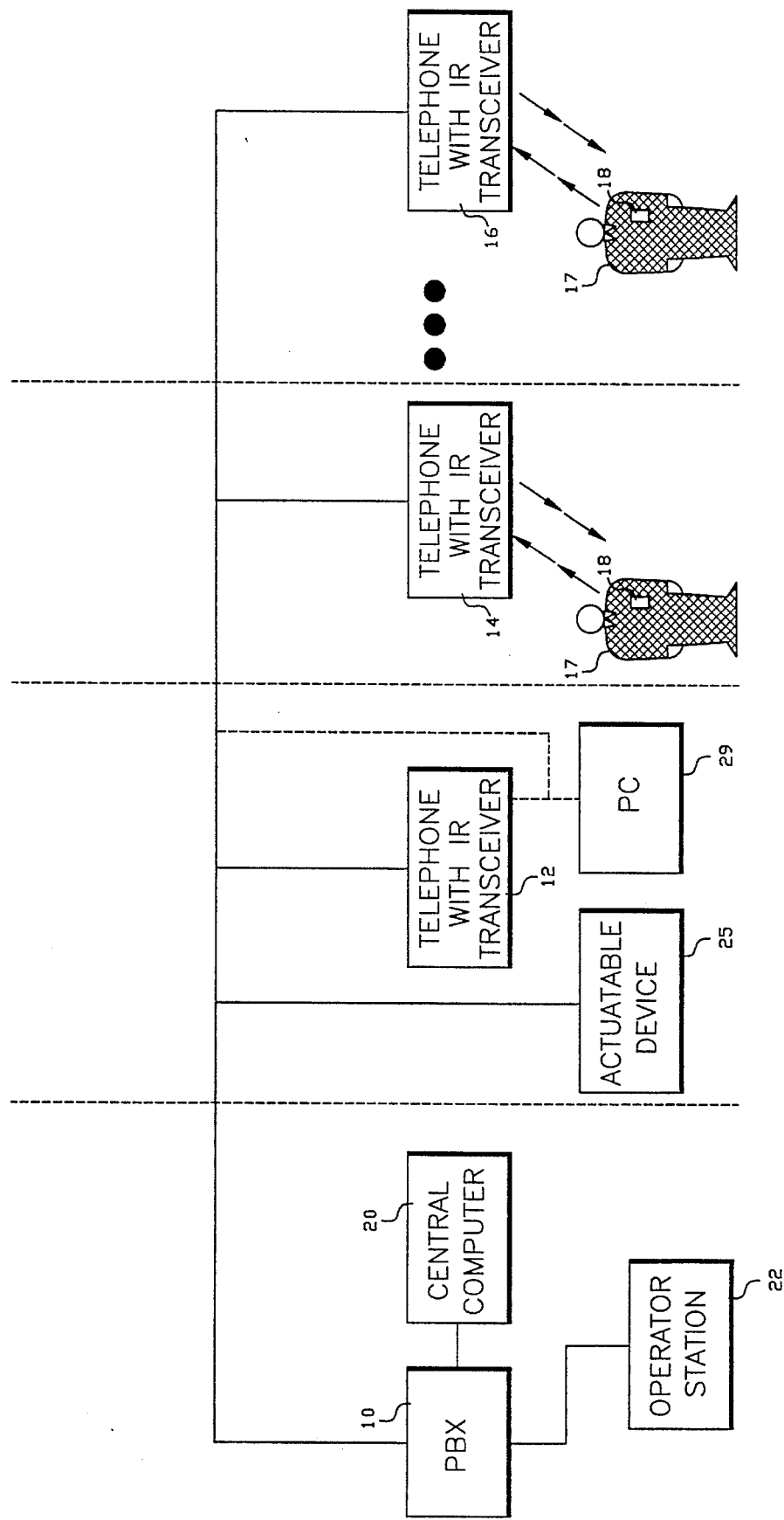
FIG. 2 illustrates an alternative system configuration for the telephone locator system of the present invention.
Figure 9:
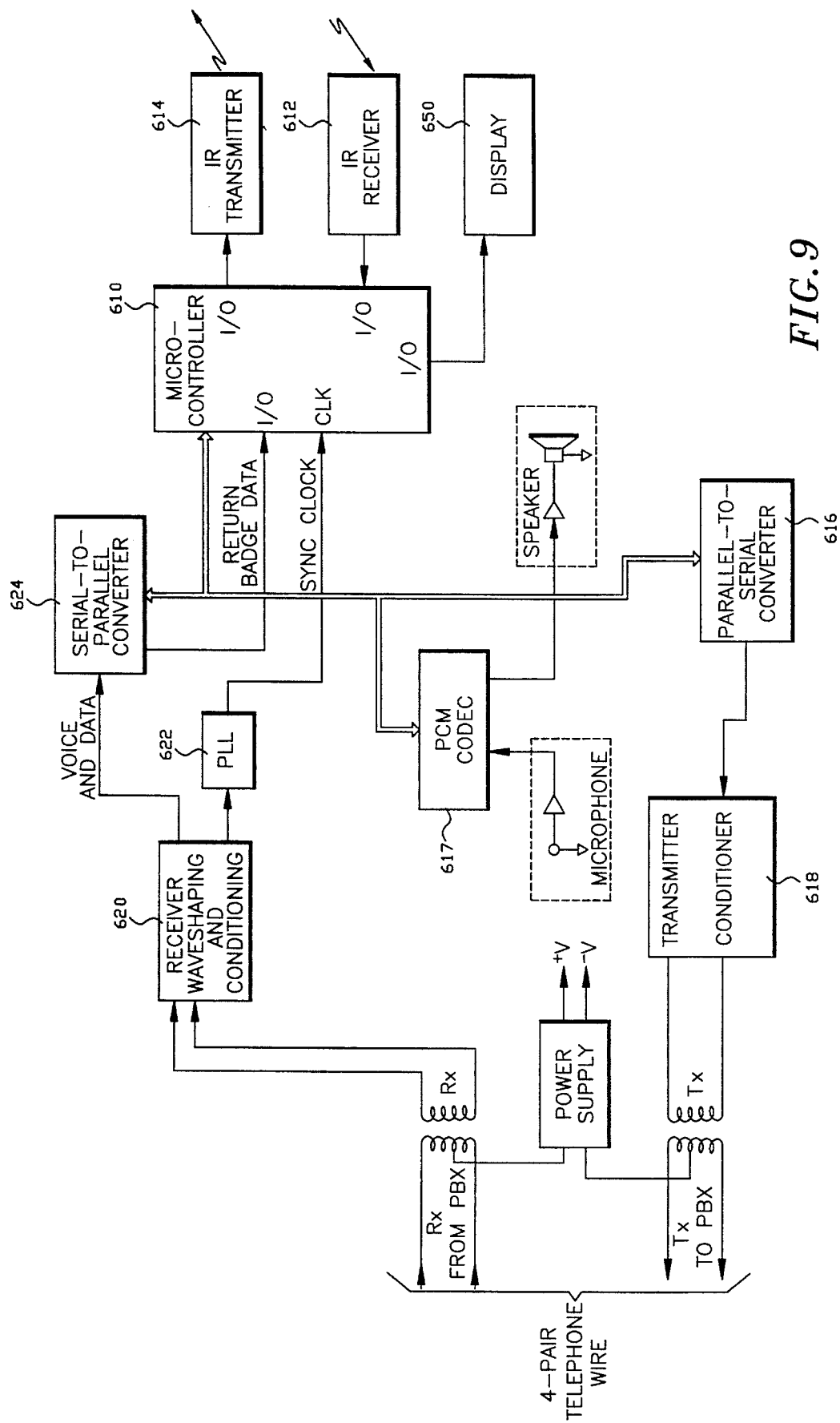
FIG. 9 is a block diagram of the components for the telephone transceivers of FIG. 2.

In an alternative embodiment as shown in FIG. 2, a transceiver is incorporated into each of the telephones 12, 14 and 16, i.e., each of the telephones includes a wireless sensor for receiving wireless transmissions from the badges. The badge information can then be relayed by the telephones to the PBX through the existing telephone to PBX connections. In a further alternative embodiment, each telephone (12, 14, 16) includes a wireless transmitter and each badge includes a wireless receiver to facilitate bidirectional wireless communication between the telephone and the badges. The badge signals received by the telephones include telephone user information, such as the identification information of the remote transmitter for the telephone user. Each telephone preferably includes a display for displaying the location of the called person. If the called person is moving from one location to another and the telephone connection remains connected, the locations of the called person may be updated substantially continuously on the display, so as to enable the caller to track the location(s) of the called person. An exemplary telephone having a transceiver is shown in FIG. 9 and is disclosed below. FIG. 2 also shows an operator station 22 and actuatable device 25 connected to the PBX 10. A personal computer (PC) 29 may be linked to the PBX 10, either directly or through the telephone 12. The operator station 22 is used to perform operator functions such as connecting incoming calls to the users of the facility. According to the present invention, the operator station 22 includes a display for displaying, on demand or on a continuously updated basis, the locations of the users of the system and also identify the persons located at specified telephone extensions.

The actuatable device 25 may be a mechanical or electrical device, e.g., a thermostat, a door lock which may be remotely controlled by commands from the PBX. The PC 29 may communicate with the PBX to access function modules such as a Logical Function Module to be described below.

Remote Transmitting Device

Figure 3:
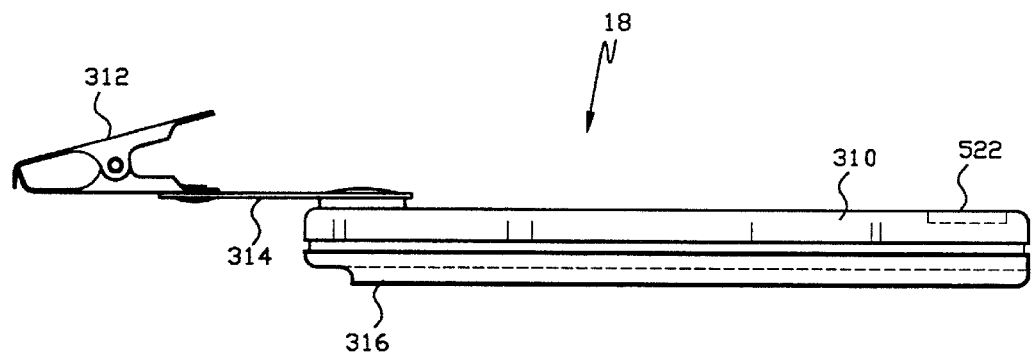
FIG. 3 illustrates a side elevational view of the housing of an exemplary badge unit according to the present invention.
Figure 4:
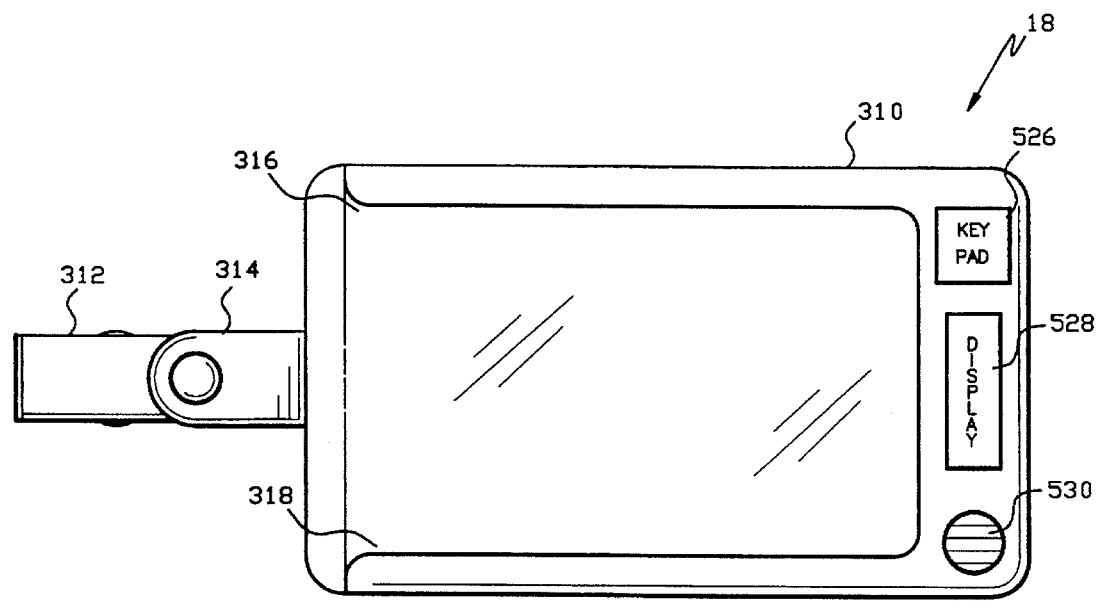
FIG. 4 illustrates a top plan view of the housing of the badge unit according to the present invention.

An example of a suitable transmitting/receiving device (badge) is shown in FIGS. 3–5 and 7. As shown in FIGS. 3 and 4, the transmitting/receiving device is a badge unit 18 having associated electronics enclosed in housing 310. Generally, housing 310 is shaped and sized like an ordinary credit card and includes clip 312 which is secured thereto via resilient band 314, so the badge can be worn by personnel. Preferably, housing 310 is approximately 3.8 inches in length, 2.27 inches in width and 0.39 inches in thickness and includes slots 316 and 318 for slidably receiving and maintaining a personnel or a smart card. Card switch 520, shown in FIG. 5, is disposed in slot 316 in the path of the personnel card so that when the personnel card is inserted into slots 316 and 318 of housing 310, card switch 520 is opened. The personnel card may be an ordinary business card, a smart card having electronically stored information, or like member which includes a prearranged mark pattern, which when coupled to the housing, produces data which may represent canned messages.

According to the embodiment as shown in FIGS. 5–7, the personnel card may be a function card 320 having a plurality of function keys 322 arranged thereon in a standard keypad matrix. The keypad matrix is coupled to edge connector 324. One or more serial number generator 326 is coupled to the keypad matrix such that upon pressing the appropriate function key or sequence of function keys, preassigned data is output to the edge connector 324. The serial number generator 324 includes a number, which may be up to 48 bits, which has been embedded in silicon. The serial number generator is connected to a high voltage level and ground to create the '1' and '0' data. The preassigned data may be prearranged to represent an identification number, a password, or canned messages. The data output at the edge connector 324 is transferred to microcontroller 510 of badge unit 18. An example of a suitable serial number generator is the model DS2400 silicon serial number manufactured by DALLAS Semiconductor. Function card 320 is in a streamline configuration so that it may be inserted within slots 316 and 318 of housing 310, as shown in FIG. 7. In this alternative embodiment the function card 320 is coupled to microcontroller 510 via edge connectors 324 and 328, as shown in phantom in FIG. 5. Edge connector 328 is positioned within slots 316 and 318 of housing 310 so as to engage edge connector 324 when the function card is inserted in the slots, as shown in phantom in FIG. 7.

As noted, the function card is coupled to microcontroller 510 and is provided to activate predefined functions from predefined commands. The predefined functions are performed by microcontroller 510. For example, an individual may initiate a locator function (described hereinbelow) from the badge unit 18 by pressing a single function key or a sequence of function keys, which define a command signal. The command signal is transferred to microcontroller 510 which reconfigures the command signal and transmits corresponding badge data to a telephone IR receiver or to transceiver 24. The telephone then transfers the badge data to PBX 10 and/or computer 20 to activate the selected function. Preferably, the functions keys may be used to define custom instructions specific to the user. For example, the badge user may enter his password and define specific conditions to be met before a call is transferred to his extension from the locator system. In another example, the function key may cause microcontroller 510 to transmit a preassigned ("canned") message to perform a specific function, such as change the voice mail function to the secretary tracking function. Such functions are described in more detail below. The function card may also be utilized to initiate a station reconfigure function which is also described hereinbelow.

Figure 8:
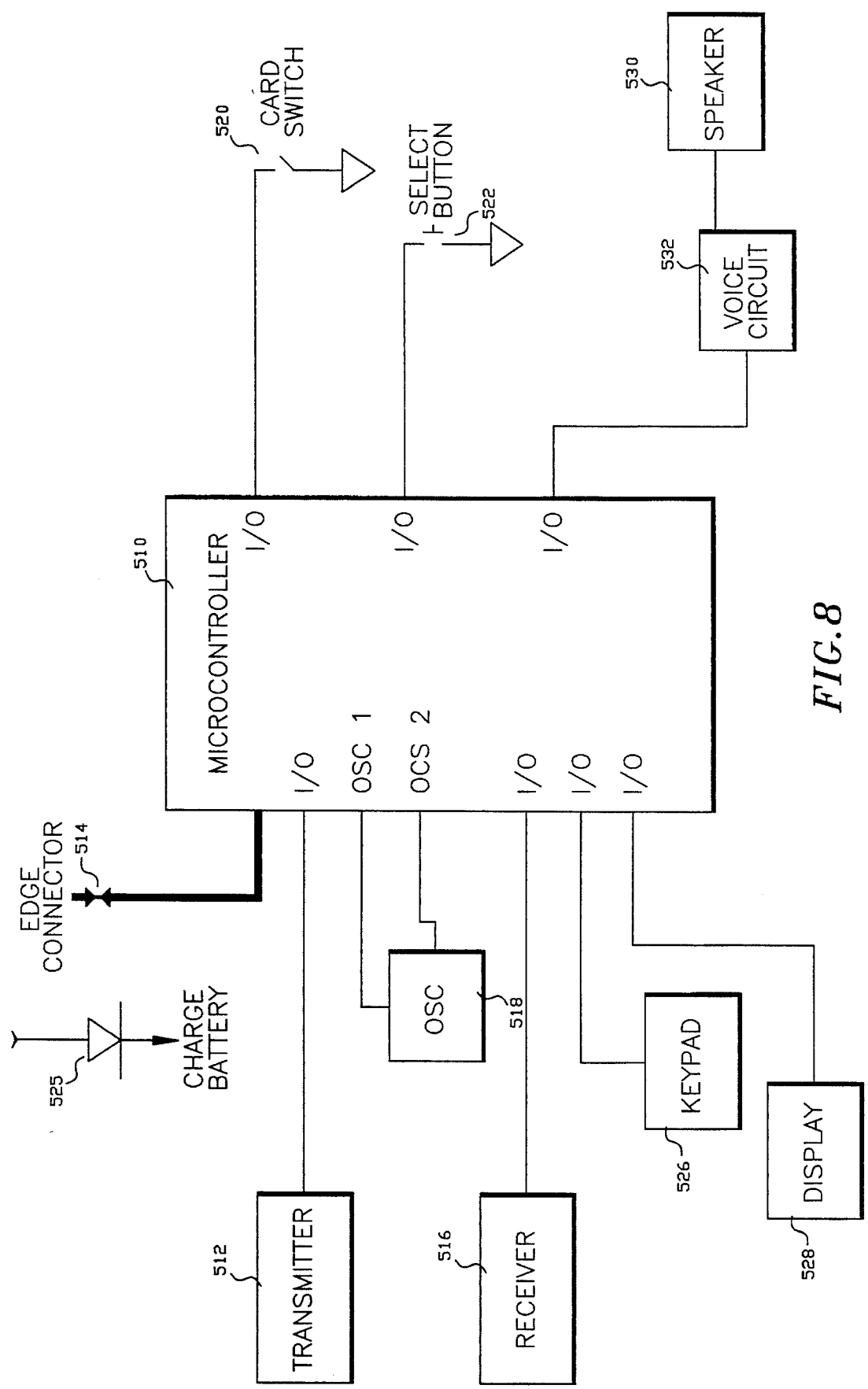
FIG. 8 is a block diagram of the components of the badge unit according to the present invention.

The housing 310 also includes select button switch 522, shown in FIGS. 3 and 8, which facilitates manual communication to microcontroller 510 so that a user may select desired operational functions, such as mode select or transmission of a preselected message. The function selected is dependant upon the number and sequence of button pushes. The modes of operation may include: "erase memory" for erasing the contents of the RAM memory; "turn-off transmitter" for disabling any transmission from the badge; "card reinsertion" for turning off the badge when the personnel card is removed until a card is reinserted; "ID code change" for changing the ID code to a special preselected code to signal an abnormal condition; and "disable counters" mode, which overrides parameter operations for turning off or disabling the badge and maintains badge operations. Alternatively, the housing 310 may include a keypad 526 which facilitates manual communication to microcontroller 510 so that a user may select desired operational functions, as well as transmit messages to computer 20. The housing further includes a display 528 for displaying information transmitted to or received from computer 20. More particularly, the display is utilized to display the operational functions selected by select button switch 522 or keypad 526, any messages or data entered by the keypad and any messages or data received from computer 20. A speaker 530 and associated voice circuit 532 may also be included in housing 310. The speaker is provided to broadcast audio messages, for example, messages received from computer 20. Voice circuit 532 translates digital signals received by receiver 516 and processed by microcontroller 510 to audio signals which excite speaker 530.

FIG. 8 shows the components of the exemplary badge unit according to the preferred embodiment of the present invention. The badge unit circuitry includes a microcontroller 510 for controlling the operations of the badge and a transmitter 512 for transmitting or radiating signals to a plurality of receivers. Preferably, transmitter 512 is an infrared transmitter. Microcontroller 510 is preferably a single integrated circuit chip which includes a processor, RAM and ROM memory and input/output (I/O) ports. The ROM memory may be of the programmable type which stores software programs for operating the badge. Examples of programs stored within the ROM include: a program for controlling transmitter 512; for monitoring operational parameters of the badge unit; and for interfacing with external devices. Generally, the operational parameters are used to safeguard against unauthorized use of the badge and to conserve battery power. The parameters include: rate of transmission; maximum duration of operation; card-out duration; maximum number of transmissions; and the length of the ID.

The "rate of transmission" parameter is the time rate or period between each transmission from the transmitter 512. This parameter value is input to a counter and is counted down to zero until the next transmission. The actual rate of transmission will vary from badge to badge even if each badge is preset with the same rate of transmission because the microprocessor clock is derived from a resistor/capacitor time constant network and the microprocessor clock period will necessarily vary along with the variations within the tolerance of the resistor/capacitor devices. With such variations, when more than one badge is transmitting to the same receiver, the likelihood of two consecutive transmission bursts of information arriving at precisely the same time as the receiver is substantially nonexistent.

The "maximum duration of operation" parameter is a preset time limit which is monitored by the microcontroller processor. The expiration of this parameter causes the badge to switch to another operating mode. This parameter allows a system administrator to limit the time of usage of the badge dependent upon the user. This parameter is also useful for automatically turning off the badge after a certain time of operation to conserve battery power.

The "card out duration" parameter is the amount of time which is monitored when the personnel card is removed from the badge. The expiration of the card out duration will cause the badge unit to turn off or switch to another operating mode.

The "maximum number of transmissions" is a count value which is decremented each time a badge transmits. When this value reaches zero, the badge unit will, depending on the preset mode of operation, halt all transmissions, alert the user of the condition, and/or switch to another preselect operation mode.

The "length of ID" allows the user to adjust the transmission of the length of ID to include other pertinent information. The RAM memory includes a database for storing such information, e.g., badge data, including the identification code of the badge and operational parameters which are retrieved and monitored by the processor for operating the badge unit. The database may further include information such as passwords, access codes for secured areas, or canned messages. The processor functions include: logical and arithmetic operations and coordination of data transfer to and from microcontroller 510. A microcontroller such as the PIC®16C5X manufactured by Microchip Technology, Inc. is used in the preferred embodiment of the present invention. However, it is apparent to one skilled in the art that any microcontroller having equivalent performance characteristics and similar in size may also be used.

An edge connector 514 facilitates interfacing the components of the badge to an external processing device ("the base"), such as a computer. The edge connector 514 preferably has four connections which include a "Bidirect I/O" connection to an input/output port of microcontroller 510 for bidirectional communication with the microcontroller. Data can be written into or read out of the microcontroller memory by an external processing device through this connection. A standard serial interface protocol such as RS-232 may be used for data communication to the external processing device. An "In-Base" connection is monitored by the microcontroller 510. An active signal at the "In-Base" input indicates that the microcontroller is to relinquish control of the badge unit to the external processing device. The badge according to the present invention is powered by a battery, which preferably is made of lithium. However, other battery designs such as a NICAD (nickel cadmium) rechargeable type or solar cell may also be used. Therefore, another input connection of edge connector 514 in combination with blocking diode 524 may be used to recharge the battery. The fourth connection of the edge connector 514 is a spare input/output.

As noted above, the badge may also include a wireless receiver adapted to receive radiated signals from transceivers or the telephones. Generally, the wireless receiver 516 has a light sensitive LED array which is utilized to input data received from a telephone into microcontroller 510 by serially strobing a light source modulated by data into the microcontroller 510.

An oscillator 518 is connected to the microcontroller 510 and provides an oscillation signal, which in turn generates a clock signal for clocking or timing purposes. In the preferred embodiment, oscillator 518 includes a resistor/capacitor combination for providing a clock which operates at a frequency of about 455 kilohertz. Due to variations in the tolerances of the resistor/capacitor combination, the clock rate for each badge unit will vary from one badge to another substantially around 455 kilohertz. The microcontroller 510 also includes a prescaler for providing timing and clock signals. A more detailed description of the badge unit and the data format of the infrared transmission is described in commonly assigned U.S. patent application Ser. No. 08/087, 394 filed Jul. 2, 1993, which is incorporated herein by reference.

Telephone Circuitry

FIG. 9 illustrates an exemplary embodiment for the hardware of each telephone utilized within the facility. The telephone circuitry includes microcontroller 610 for controlling the operations of the telephone and communication hardware for interfacing the telephone with the PBX. The microcontroller and communication hardware provide standard telephone communications with the PBX, and include, for example, a keypad for dialing, a ring indicator for identifying incoming calls, a handset with a speaker and microphone, and in some instances, an LCD display for providing visual information. The telephones of the present invention also include infrared receiver 612 for receiving badge transmissions and an optional infrared transmitter 614 for transmitting infrared signals from the telephone to the badge.

Preferably, microcontroller 610 is a single integrated circuit chip which includes a processor, RAM and ROM memory and I/O ports. An example of a suitable microcontroller is the model 80C51 manufactured by Motorola. However, one skilled in the art would know that any microcontroller having equivalent performance characteristics may also be used. The ROM memory may be of the programmable type which stores software programs for operating the telephone features, e.g., a Rolodex type directory of telephone numbers for access and display by the user, for speed dialing or displays of pertinent information such as the number of the called telephone, the location of the called personnel, or a real-time count of the duration of the call, etc.

Figure 10:
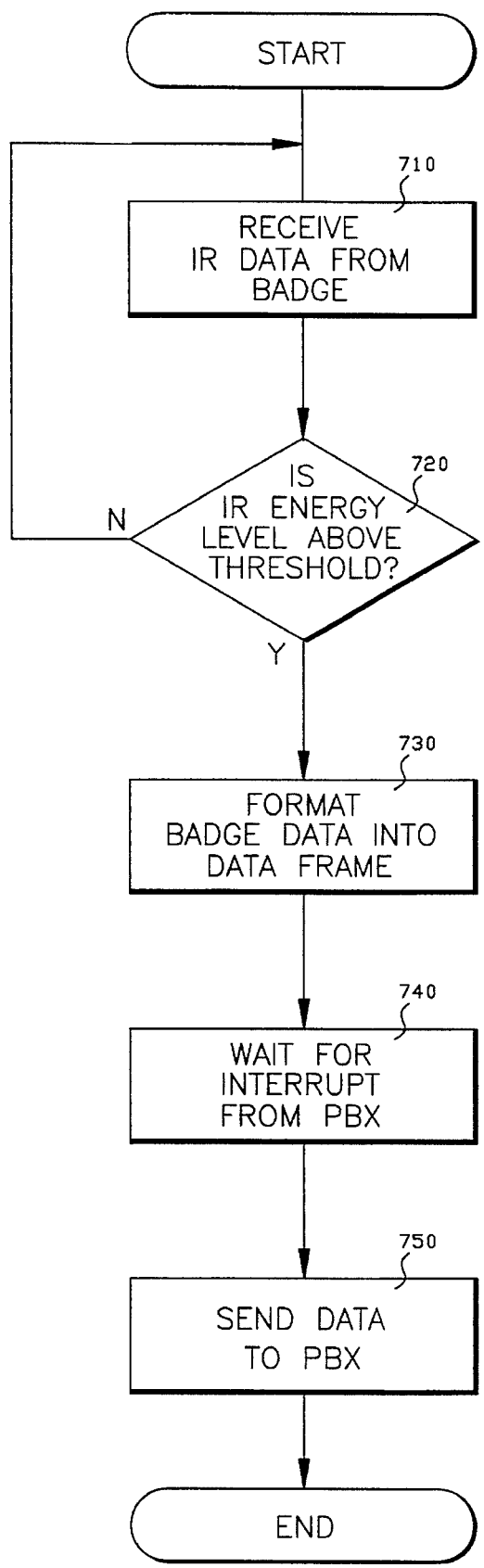
FIG. 10 is an exemplary flow diagram showing a process of the transceivers in receiving badge data and transmitting the data to the PBX.

Examples of programs stored within the ROM include: a program for controlling the reception of badge data and transmission of return badge data to badge unit 18; programs for transferring the received badge data to the PBX; and programs for receiving return badge data from the PBX. An example of one such program is illustrated in FIG. 10. In this example, the infrared (IR) badge data is received by receiver 612 and transferred to microcontroller 610 (step 710).

Microcontroller 610 determines the energy level window of the received infrared signal, using a plurality of comparators each having a predetermined threshold value so as to provide a signal range or window of the energy level of the received signal (step 720), and formats the badge data including the IR energy level data into a microcontroller data frame (step 730). Microcontroller 610 then waits for an interrupt from the PBX and upon receipt thereof sends the badge data to the PBX. Alternatively, microcontroller 610 forwards the data frame to the PBX in a periodic basis (e.g., every 2 seconds) without any interrupt from the PBX. The data frame may be forwarded to the PBX, for example, via a robbed bit signaling technique, which will be described in more detail below (steps 740 and 750).

The RAM memory of microcontroller 610 may include storage of the retrieved badge data and the return badge data. Functions associated with the microcontroller processor include: logical and arithmetic operations and coordination of data transfer to and from microcontroller 610.

The other components of the telephone, including receiver waveshaping and conditioning 620, PCM codes 617, transmitter conditions 618, parallel-to-serial and serial to parallel converters 616 and 624, respectively, are well known telephone components, the operations of which are apparent to one skilled in the art, but are further described below.

Telephone Infrared Receiver

Figure 11:
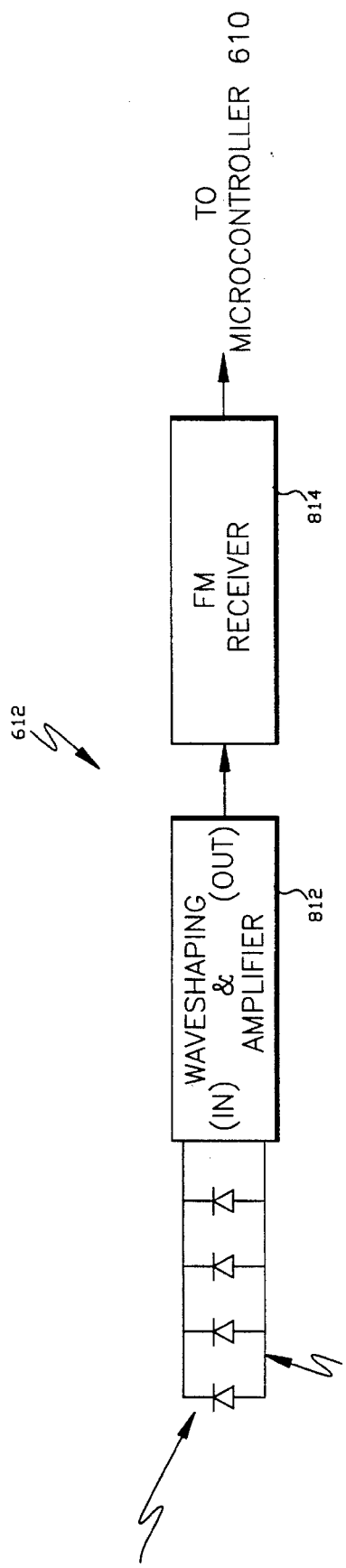
FIGS. 11 and 12 are block diagrams of an infrared receiver and transmitter, respectively, suitable for the infrared receiver and transmitter portion of the telephone according to the present invention.

Referring to FIGS. 9 and 11, an exemplary embodiment for the infrared receiver portion 612 is illustrated. Infrared light sensitive diode array 810 receives infrared signals, preferably frequency modulated infrared signals, transmitted from an infrared transmitter, such as badge unit 18. Waveshaping and amplifier network 812 conditions and amplifies the signals generated by the diode array 810. FM receiver 814 demodulates the data from the carrier signal and serially transfers the received data to an I/O connection of the microcontroller 610. According to the preferred embodiment of the present invention, the receiver is capable of receiving infrared transmissions from badge units up to a distance of 30 feet. Microcontroller 612 receives the serial data from FM receiver 814 and extracts the badge data, e.g., the identity information, associated with badge unit 18. The extracted data is reformatted and forwarded in a message frame to PBX 10 in a manner as will be described below. A more detailed description of the FM infrared transmitter and receiver and their operation are described in U.S. Pat. No. 4,977,519 to J. Crimmins, which is incorporated herein by reference.

Telephone Infrared Transmitter

Figure 12:
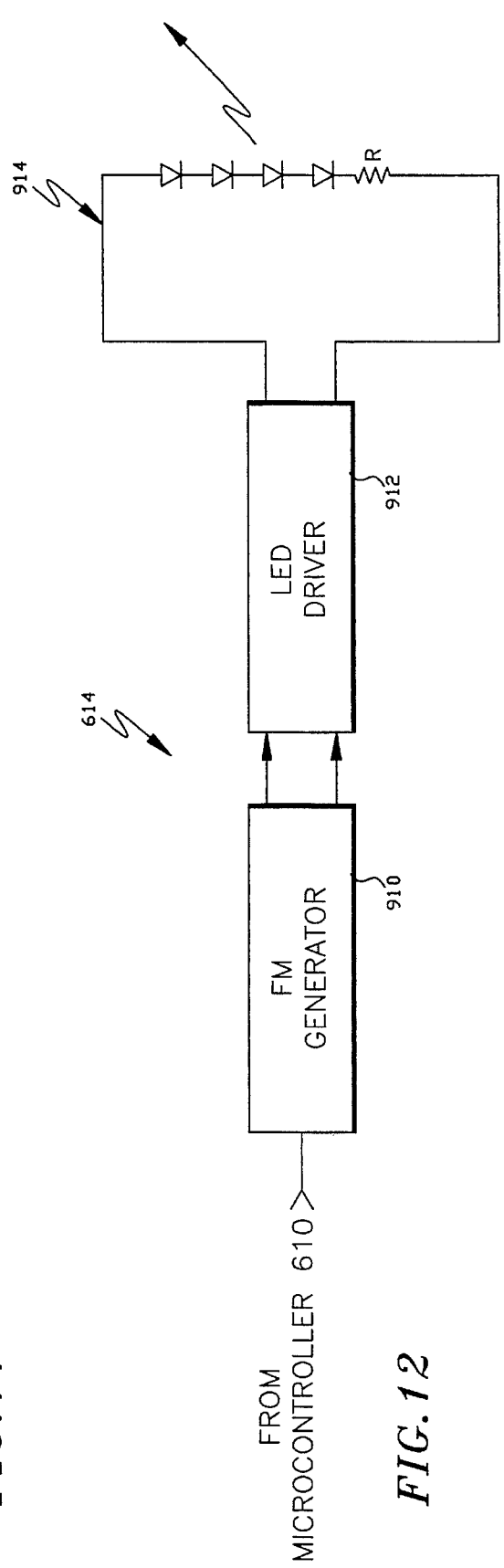

Referring to FIGS. 9 and 12 an exemplary embodiment for the infrared transmitter portion 614 is illustrated. Transmitter portion 614 includes FM Generator 910, LED driver 912 and LED array 914 which radiate energy for detection by the badge unit. FM Generator 910 receives from microcontroller 610 a serial data bit stream reflective of the information to be transmitted and generates a carrier signal which is frequency modulated by the serial data. The modulated signal is fed to LED driver 912 for providing current driving capability to LED array 914. According to the preferred embodiment, LED array 914 emits infrared signals. The FM infrared signal transmission technique is known to one skilled in the art. A more detailed description of an FM infrared transmitter/receiver and its operation is described in U.S. Pat. No. 4,977,519 to J. Crimmins. It is also readily apparent to one skilled in the art that other known wireless data transmission techniques may be used, e.g., RF transmission and reception.

Hub Configuration

Figure 13:
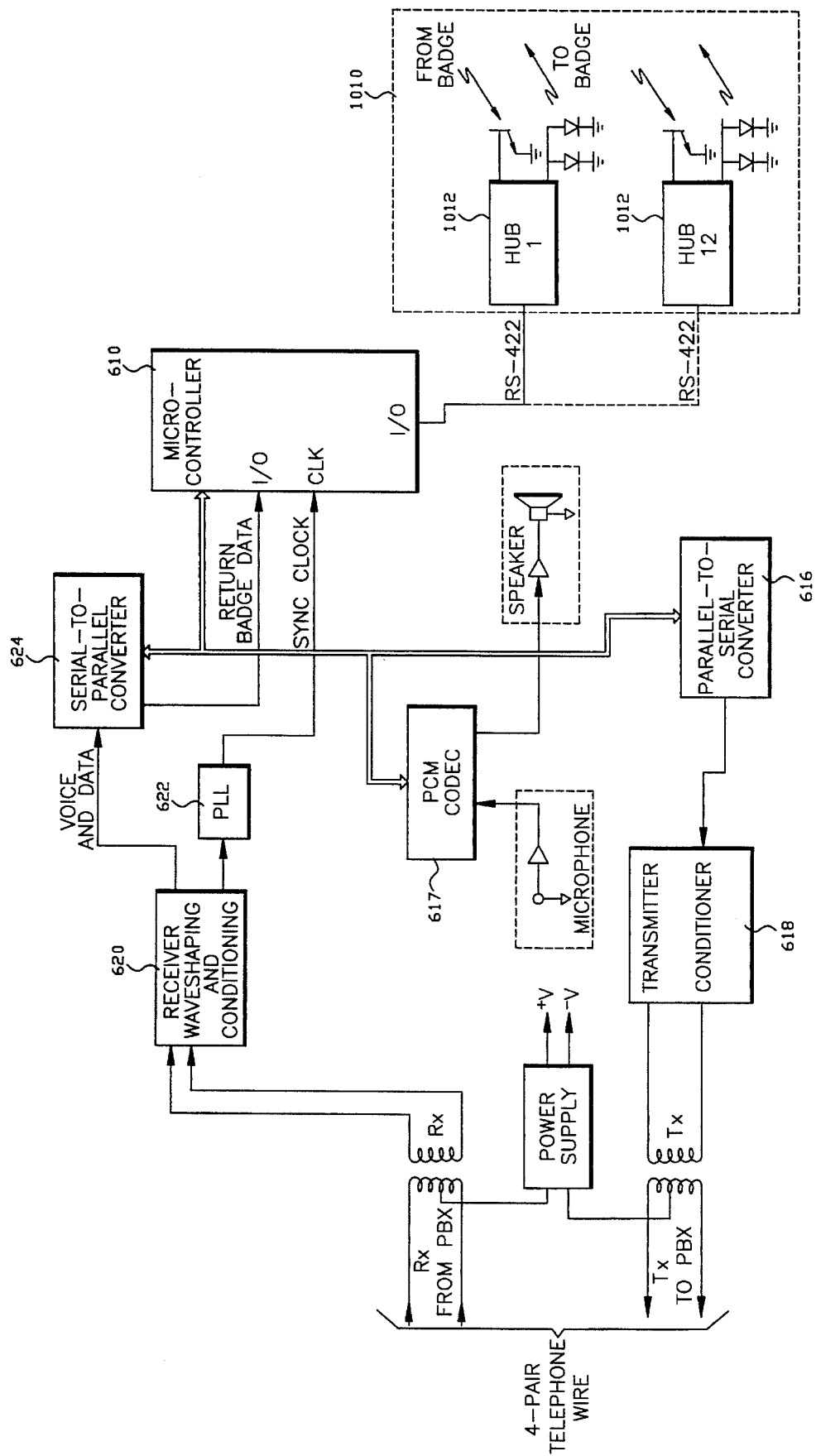
FIG. 13 is an alternate configuration of a transceiver having hub transmitter/receivers.
Figure 14:
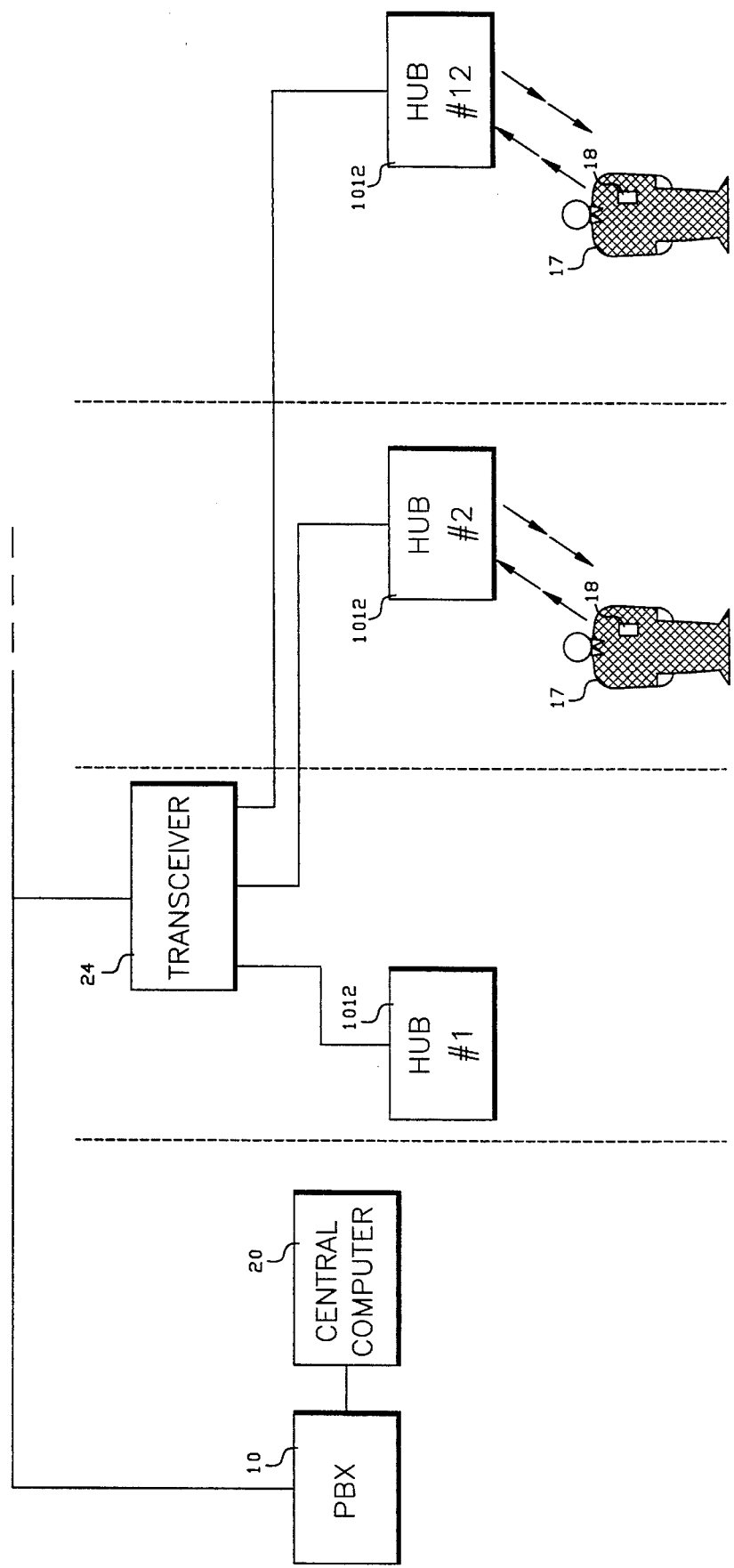
FIG. 14 illustrates the alternative telephone communication having the transceivers in a hub configuration.

The infrared transmitters and receivers associated with the telephones of the present invention may be connected in a remote hub arrangement 1010, as shown in FIGS. 13 and 14. In the preferred embodiment, the number of hubs 1012 range between one and twelve and the number of badges associated with each hub may range between 1 and 50. However, the number of hubs and the badges associated with each hub may be increased by expanding the communication bandwidth of the hub and/or the badges. The hubs 1012 receive the infrared signals from the badge, extract the badge data and reformat the data for communication to microcontroller 610. A standard interface protocol such as RS-422 may be used for data communication between the hub and the microcontroller 610. In addition, hubs 1012 may also be configured to receive return badge data from microcontroller 610 and transmit the data to the associated badge.

Badge to Receiver Communication

The data format of the transmission between the badge unit and the telephone infrared receiver according to the preferred embodiment of the present invention will now be described. When the initial software steps required for microcontroller 510, shown in FIG. 8, to transmit data are completed, the processor in microcontroller 510 fetches the data to be transmitted from the RAM memory location recognized to have the stored data for transmission, e.g., the badge identification number. The processor adds the necessary information and formats the data into an eight bit word, framed by start and stop bits. An exemplary data burst is as follows:

| Byte 1: | START / | CONTROL & PARITY | / | ID | /STOP |
|---|---|---|---|---|---|
| Bytes 2–5: | 1 START / | 2  3  4  5 | ID | 6  7  8  9 | 10 /STOP |
|  | 1 | 2  3  4  5 |  | 6  7  8  9 | 10 |

The control and parity field (e.g., bits 2 to 5 of byte 1) identifies the type of data word to follow. For example, a fixed or a variable length data word. A fixed length data word may be known in the system as 5 bytes long. If the data is variable length, the length of data to be transmitted is identified in the control field. Parity information may also be included in this field.

The formatted data is forwarded serially from microcontroller 510 to the transmitter for transmission to a wireless receiver, e.g., telephones 12, 14 and/or 16, shown in FIG. 1. The data transmission duty cycle is selectable and preassigned, i.e., both the data transmission rate and the period between each data burst are selectable parameters and are preset during initialization. Preferably, the data is selected to transmit to the receiver at a rate of 19.2 khz and the time between each data burst (transmission period) is one to five seconds. The transmission period may vary between milliseconds to hours.

Communication Between the Telephone and the PBX

The badge data retrieved by microcontroller 610, shown in FIG. 9, is configured for transmission to the PBX and stored in the microcontroller memory. Typically, voice and data communication between the telephone and the PBX is in the form of message frames which are divided into fields, e.g., a data field and a control field. As an example, the data field associated with voice data to the telephone is approximately 64 kilobits in length and the control field is approximately 2 kilobits in length. The control field includes a sync bit for synchronizing communications between the telephone and the PBX. The preferred transmission rate for data is 19.2 kHz.

Figure 15:
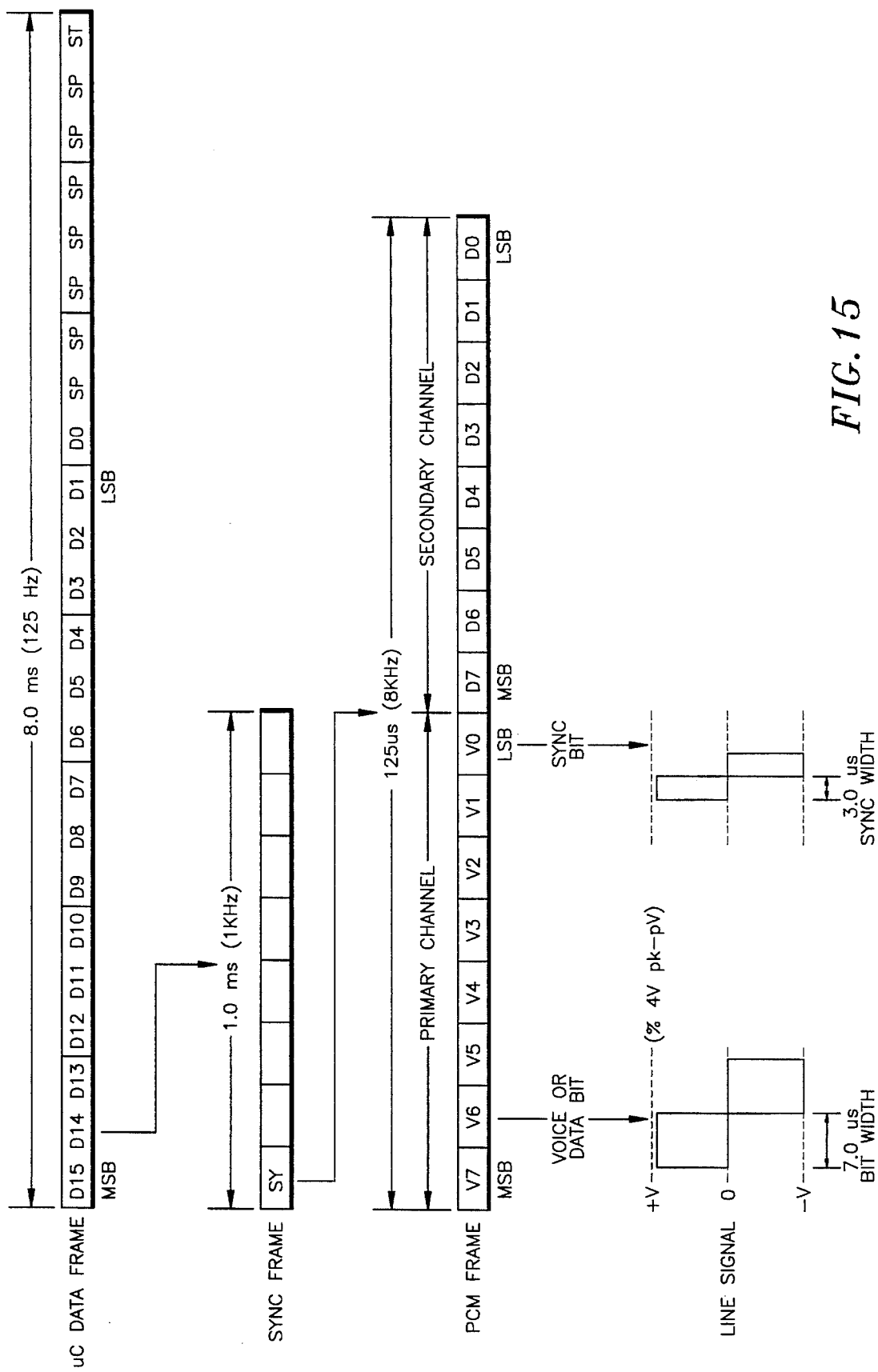
FIG. 15 illustrates exemplary data frames for communication between the telephone and the private-branch exchange.
Figure 16:
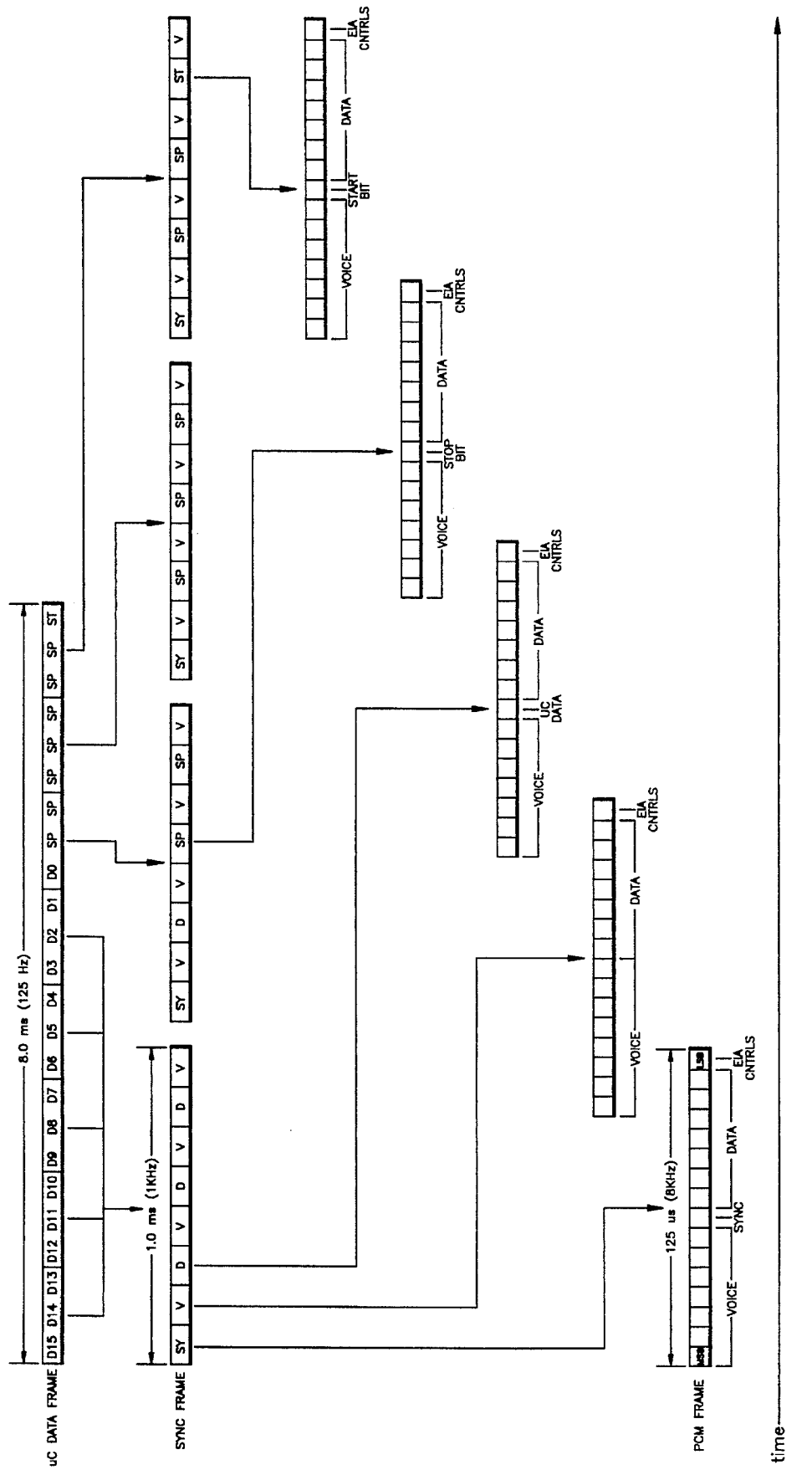
FIG. 16 illustrates the data frames of FIG. 15 in an expanded form.

FIGS. 15–17 illustrate typical system timing and format diagrams for the communication of data frames between the telephone or the transceiver of the present invention and the PBX 10. As shown in FIG. 15, the data from microcontroller 610 in each telephone is configured in a 16 bit parallel data word on the microcontroller data bus, which is preferably framed by one (1) start bit and seven (7) stop bits. Communications with the PBX system timing, on the other hand, are in a serial mode, therefore, the 16 bit parallel data word is converted to a serial data stream via parallel-to-serial converter 616. In addition, a synchronization bit (sync bit) is added into each microcontroller data frame so as to maintain clock alignment between the PBX and the telephone.

The transfer of the badge data to the PBX is preferably via a secondary channel of the PBX, such as the data channel of an IDS 228 PBX, available from EXECUTONE Information Systems, Inc. The data format of such PBX is similar to the transmission format of the data channel in the Basic Rate Interface of the ISDN.

Alternatively, a robbed bit signalling technique may be used, utilizing the robbed bit technique, one bit within every forth transmission of the microcontroller data frame is utilized for the transmission of the badge data. Thus the effective data transmission rate of the badge data is approximately 2 kilobits, while the overall data transmission rate between the PBX and the telephone is 64 kilobits. Actual voice and telephone data transmissions between the PBX and the telephone may be by PCM format, which utilize a primary channel. The secondary channel may be used for voice and/or data. PCM CODEX 617 compresses the analog voice data and formats the voice and data transmissions in the PCM format. Transmitter conditioner 618 amplifies and modulates each frame for transmission to the PBX. The primary channel is preferably a 64 kilobit channel to transfer the badge data to the PBX, as noted above. The primary channel is also used to transfer control information for the peripheral device (e.g., the PBX), a synchronization bit for the hardware, and the PCM voice signal. Preferably, the secondary channel is also a 64 kilobit channel to transfer badge data and is utilized to transfer EIA controls via robbed bit signalling for RS-232 or other applications.

The badge data is formatted in the following protocol by microcontroller 610:

IR; ST; ENERGY LEVEL WINDOW; DATA; SP where the IR field is one byte and provides the PBX with the type of signal received from the badge (e.g., infrared), and the ST field, also one byte, is the start message field. The ENERGY LEVEL WINDOW field is one byte and provides the PBX with a range of the energy level or the strength of the signal received from the badge. If the energy level is below a predetermined level, computer 20 may not consider the message from the transmitting device as valid data. The DATA field is preferably between one and five bytes in length and provides the PBX with the personnel data, e.g., the badge identity. The SP field is one byte long and is the stop message field.

If the telephones and badges are arranged in a hub configuration, shown in FIGS. 13 and 14, the badge data is formatted in the following protocol by microcontroller 610:

IR; ST; ENERGY LEVEL WINDOW; DATA; SP; RECEIVER NO.

The first five fields are similar to those described above and the RECEIVER NO. field provides the PBX with the hub number (e.g., 1–12) associated with the badge that transmitted the message.

FIG. 15 also illustrates the differentiation between a sync bit pulse and the voice or data bit pulse. Typically, a sync bit is defined as the occurrence of two consecutive pulses in the time allotted for the transmission of one voice or data bit pulse.

FIGS. 16 and 17 illustrate exemplary message frame formats and timing in an expanded form for voice, telephone data and badge data between the telephone and the PBX. As noted, data from the microcontroller is in a 16 bit parallel format and is framed by one start bit and seven stop bits to form the microcontroller (uC) data frame, where each uC data frame is approximately 8 ms in length. Parallel data from microcontroller 610 along with voice and telephone data is then converted to a serial data bit stream via parallel-to-serial converter 616 which then transfers the serial signal to transmitter conditioner 618. Transmitter conditioner 618 formats the signal to be transmitted into PCM format and drives the PCM signal to the PBX via the 4-pair telephone wire.

An exemplary embodiment of the format and timing of data transmitted from the PBX to the telephone is shown in FIG. 17. Return badge data, e.g., data to notify a called party of a call, generated in the PBX is formatted into an 8 bit microcontroller (uC) data frame of approximately 8 ms. in length (i.e., 1 ms/bit). Two of the eight bits are designated as auxiliary. A sync frame is then added into each bit portion of the uC data frame and the resultant signal is conditioned for PCM transmission to the telephone.

The PCM signal received at the telephone from PBX 10 is then processed through a waveshaping and conditioning network 620. Network 620 converts the received signal from the PCM format to a serial digital format, recovers the synchronization clock to sync the timing via phase-locked loop 622, and recaptures the voice, telephone data and return badge data utilizing the robbed bit signaling technique. Data is retrieved by the receiver waveshaping and conditioning network 620 using an alternate mark inversion (AMI) conversion technique. FIG. 18 illustrates exemplary input and output waveforms of the AMI conversion technique. The AMI conversion method changes the level of the output waveform for each crossing of the zero line by the input waveform. The converted data is transferred to serial-to-parallel converter 624 which converts the data from a serial format to a parallel format, picks off the return badge data and transfers the data to microcontroller 610 for subsequent transmission to the badge.

Figure 19:
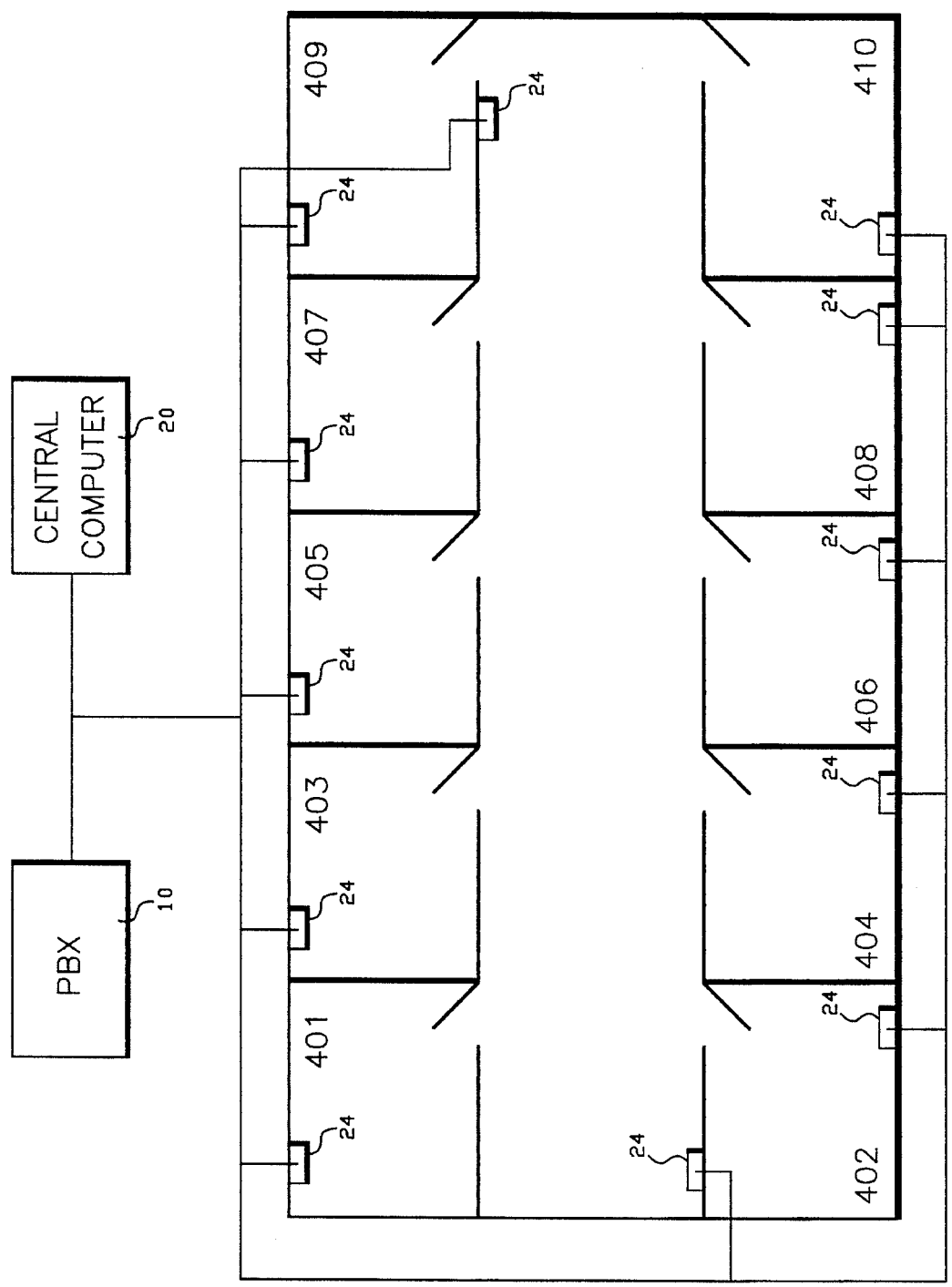
FIG. 19 illustrates an alternative embodiment of the locator system of the present invention, illustrating a wall mounted transceiver.

FIG. 19 illustrates a typical setup of the system configuration having the transceivers disposed throughout the facility, e.g., office space and hallways, have wireless transceivers 24, attached to fixed surfaces such as the ceiling or walls in the office space. In one embodiment, the transceivers 24 include the same circuitry and operate in the same manner as the wireless transmitters and receivers incorporated in telephones 12, 14 and 16 shown in FIG. 1. Thus, all functions performed by the wireless transmitters and receivers in the telephones may be performed by transceiver 24.

PBX 10 and the central computer 20 are connected to each transceiver 24 via appropriate cabling and data communications between either the PBX or the central computer and may be accomplished the same as described above with respect to the wireless transmitters and receivers incorporated into the telephones.

Alternatively, as shown in FIG. 20, transceiver 24 includes infrared transmitter 512 and receiver 516 connected to a transceiver microcontroller 510 which is coupled to a remote communications processor, such as the central computer 20 or the PBX 10. The transmitter and receiver 512 and 516 respectively, and processor 510 are described hereinabove with respect to FIGS. 8 and 9. Communications between the processor 570 and either central computer 20 or PBX 10 may be accomplished using serial or parallel communication techniques such as described for the telephones or via other standard techniques, such as, for example, RS 232.

Figure 21:
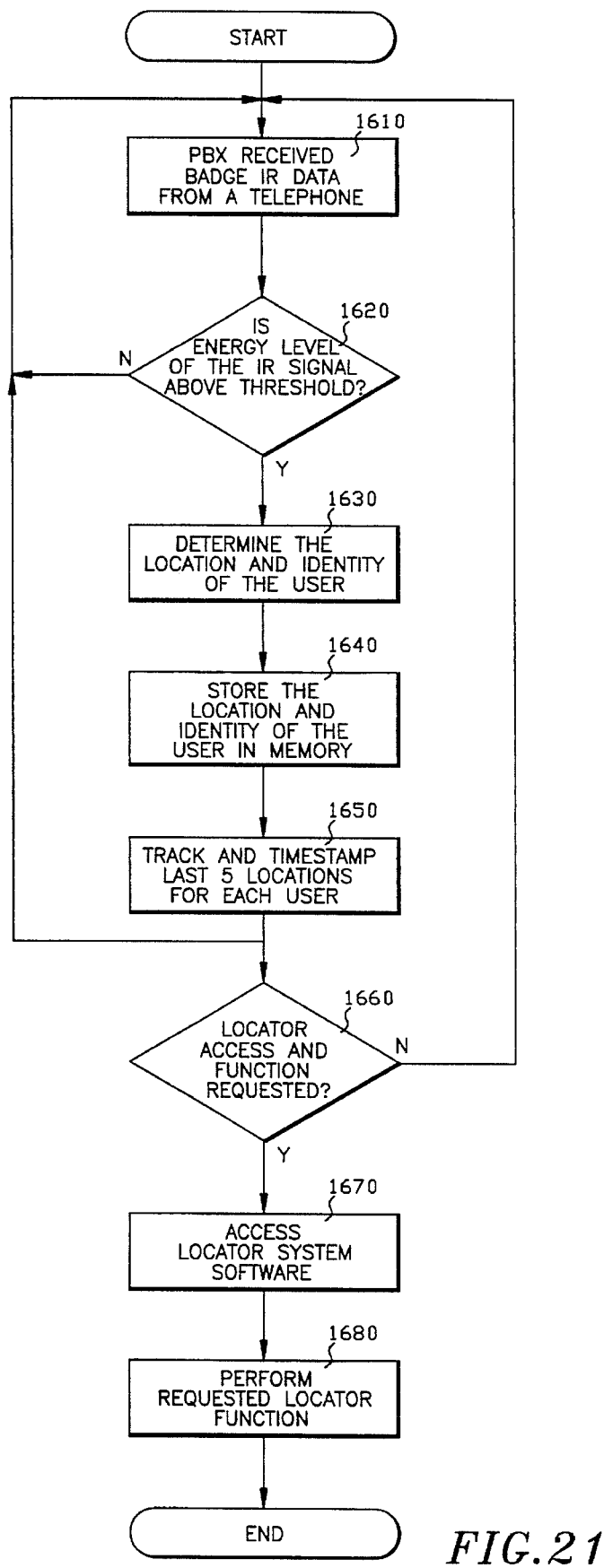
FIG. 21 is a flow-chart diagram for an exemplary operation of the telephone system of the present invention.

FIG. 21 illustrates an example of the operational flow of the system of the present invention tracking users and routing a telephone call to a user. The PBX either periodically or aperiodically receives the badge data, e.g., user identification information, from telephones or transceivers within the closed environment (step 1610). The received badge data is then transferred to the PBX 10, which determines whether the IR energy level is above the threshold level (step 1620). If the energy level is below the threshold level, the badge data is discarded. If the energy level satisfies the threshold level then PBX 10 determines the identity of the user from the user identification data and the location of the telephone (step 1630). PBX 10 and/or Computer 20 then stores the identity and location of the user in internal memory (step 1640).

According to a preferred method of the present invention, the PBX 10 and/or computer 20 archives each user's location in memory, preferably the five last locations of each user and time stamps each new location entry. The system accomplishes this by keeping a separate memory area for each user, preferably by allocating a memory area such as user ID number+10 memory locations. The PBX compares, for each user, the present location with the last entered location. If the locations are different, the new location and a time stamp, preferably the real time, is entered in memory. If the location data exceeds five different locations, the earliest locating date is discarded (step 1650).

Any user may access the locator system by using any of the telephones connected to the PBX. The user enters a locator access code such as 1 9 on the telephone keypad and then followed by a locator function code (step 1660). The PBX 10 receives and recognizes the locator access code and accesses the locator system software portion to initiate locator functions (step 1670). The locator function code is then interpreted by the locator software to perform the specified location function (step 1680).

Telephone Communication Using the Locator System

The apparatus according to the present invention is suitable for enhanced communication among telephone users for minimizing down time due to the failure to reach called personnel when needed and minimizes the disruptions that may be caused by an automated telephone routing system. According to a preferred embodiment of the invention, the telephone user adaptively controls the locator and the telephone systems at any telephone by selecting advanced telephone functions after invoking the locator system and receiving location information such as where the called person is and whether there are other people at the same location. The operation and features of the preferred embodiments are detailed below.

Locator System Functions—Locate User Function

Figure 22:
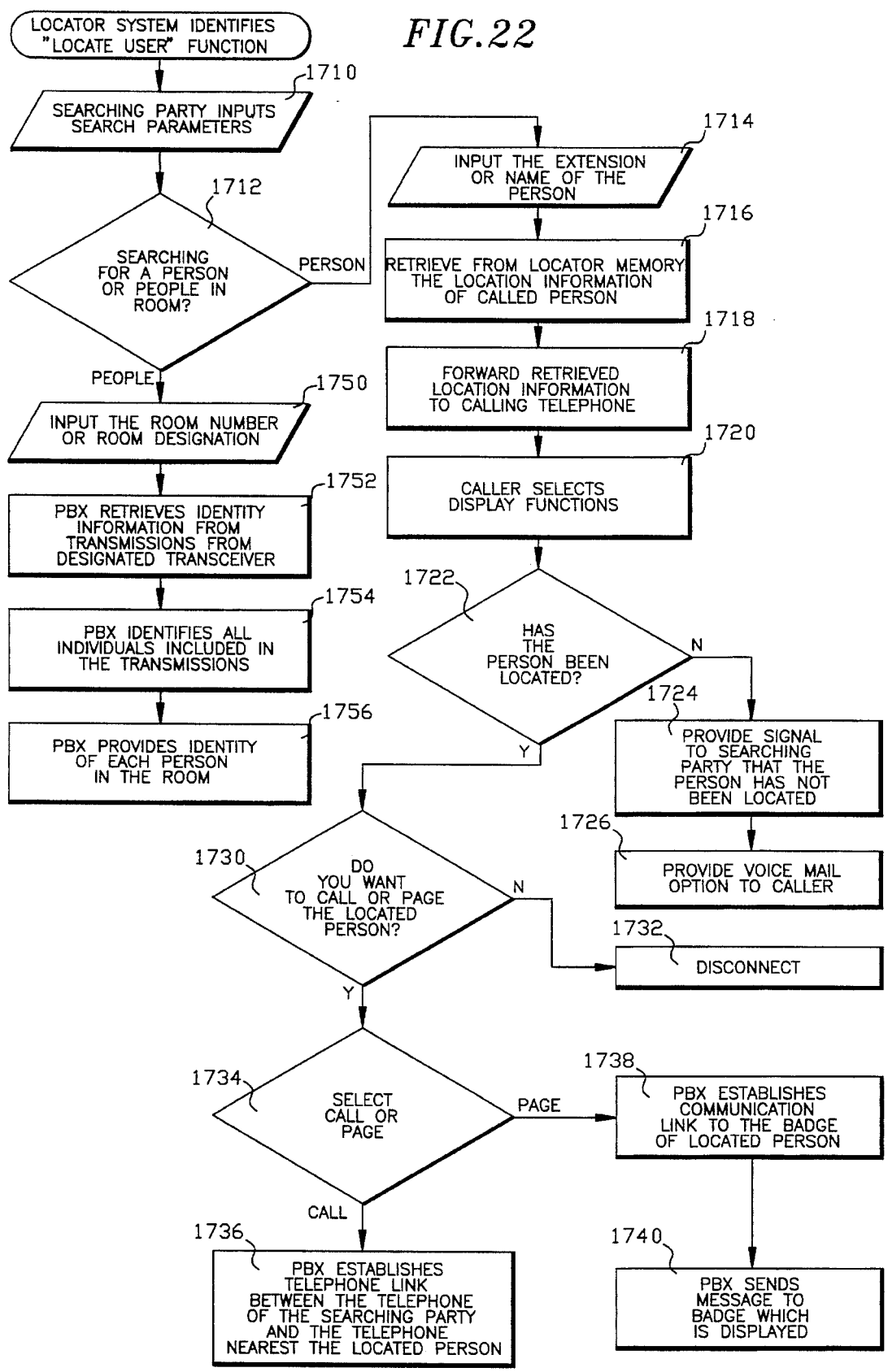
FIG. 22 is a flow-chart diagram for the utilization of the locator function to search for individuals.

FIG. 22 illustrates an example of the operational flow for locating users of the system. A user searching for the location of another user enters search instructions into any telephone connected to the PBX. For the present disclosure the individual searching is identified as "the searching party" and the individual sought is "the searched party". The locate user function is preferably the default locator function. The user need not enter a function code.

The searching party enters the 1, 9 "access locator" code and the parameters for the searched party (steps 1712 and 1714). The search parameters may include the telephone extension, name or like identifying information of the searched party. For example, the telephone entry is 1, 9 and then the extension number or 1, 9, # and the person's name in alphanumerics. Upon receipt of such command(s), the PBX 10 compares the function code with the operation codes in the command instructions previously installed in the locator system software portion of the PBX 10, to determine the "locate user" function has been requested and to initiate searching the searched party.

To locate a user, the locator system retrieves the location information previously archived in the locator memory portion allocated for the searched party (step 1716). The location information is then forwarded to the calling telephone for display on the telephone display (step 1718). For example, the display may be the called person's last detected location such as in his office or wherever he is located, such as in a copyroom. The caller may select display functions such as "track" and "audit" (step 1720). If the caller actuates a tracking mode, the location of the called personnel is displayed on display 650 of the calling telephone. The location information is continuously updated, preferably every two seconds from the PBX 10, microcontroller 610 and then display 650. As the called personnel is moving from one location to another, the changed location information is updated on the display 650. If the caller activates the "audit" mode, such as by depressing * on the calling telephone, the last five locations and the corresponding time stamps may be displayed. If the *1 keys are depressed, the last five locations of the searched party and the amount of time spent at each location may be displayed. For the *1 function, the locator software calculates the elapsed time of each location by differencing the time stamps of two succeeding locations. If there is no match in the search party's ID or name from the locator memory (step 1722), PBX 10 notifies the searching party that the searched party has not been located (step 1724). PBX 10 may provide a visual notification that the searched party has not been located on the telephone display 650 (FIG. 6). The PBX 10 may also provide an audio message that the searched party's location has not been found. Alternatively, the PBX 10 may provide a voice mail option for the searching party. If selected, the PBX connects the call to the searched party's mailbox of the voice mail system for functions such as recordal of messages for the searched party (step 1726).

If a searched party is located and the location information has been displayed on the display of the telephone of the searching party, the searching party may be queried as to whether or not the searched party is to be called at the current location or paged (step 1730). If no further communication is desired, the telephone connection is terminated by PBX 10 (step 1732). If further communication is desired, the searching party is queried to select between calling or paging the searched party (step 1734). Upon selection of the "call" query, PBX 10 establishes a telephone connection between the telephone of the searching party and the telephone nearest the location of the searched party (step 1736). Advantageously, the use of the locator system prior to "paging" on a facility wide paging system avoids the disruptions from a page. Thus, the paging system may force the user to activate the locator system prior to the actual paging.

Upon selection of the "page" query, PBX 10 establishes a communication link with the badge unit 18 of the searched party (step 1738) and sends a page message to the badge. The message may be displayed on badge display 526 or which may be audibly broadcasted via speaker 528 (step 1740). Alternatively, upon selection of the "page" query, PBX 10 may be instructed to broadcast the page at speakers and telephones in a generalized area where the called party was detected. To activate this broadcast paging feature, PBX 10 establishes a communication link to multiple telephones and speakers.

"Locate By Station" Function

This locator function identifies all users at a specific station. The function code may be a 1, 9, 7 entry followed by a room or telephone number. For the 1, 9, 7 command, the names of all the persons detected at the requested location are displayed.

Returning to step 1712, if the searching party entered 1, 9, 7 followed by a station designation such as a room number or telephone station extension (step 1750), the PBX 10 retrieves the location information data transmitted from the transceiver or telephone at the designated location (step 1752). PBX 10 then identifies each individual in the designated location from the message(s) received from the designated transceiver (step 1754). This is done at the PBX 10 by comparison of the transmitted ID codes with a data table stored in the locator memory to determine the identity of each person. Once the identity of each individual in the designated location is determined, PBX 10 provides the searching party with an audible list of the names or displays the list on the telephone display 650 (step 1756). As previously noted, the locator system including the associated locator memory and stored programs may be installed in the PBX 10 or computer 20 and the locator functions may be performed by PBX 10 and/or computer 20, either alone or in combination. Thus, the descriptions of locator functions are interchangeable for either computer 20 and PBX 10.

Group Locate Function

This embodiment permits a calling party to find any member of a group, to find a member of the group nearest the calling party, and/or to find the most recently detected member of the group. In certain closed environments individuals may be combined into various groups. For example, engineers may be combined into project teams, or maintenance workers may be combined into different task teams, e.g., housekeeping. Such group listings may be stored in the memory of computer 20 in, for example, a group data table. Upon entering a series of keystrokes or pressing a function key on the telephone, a calling party can locate and contact members in the group.

Figure 23:
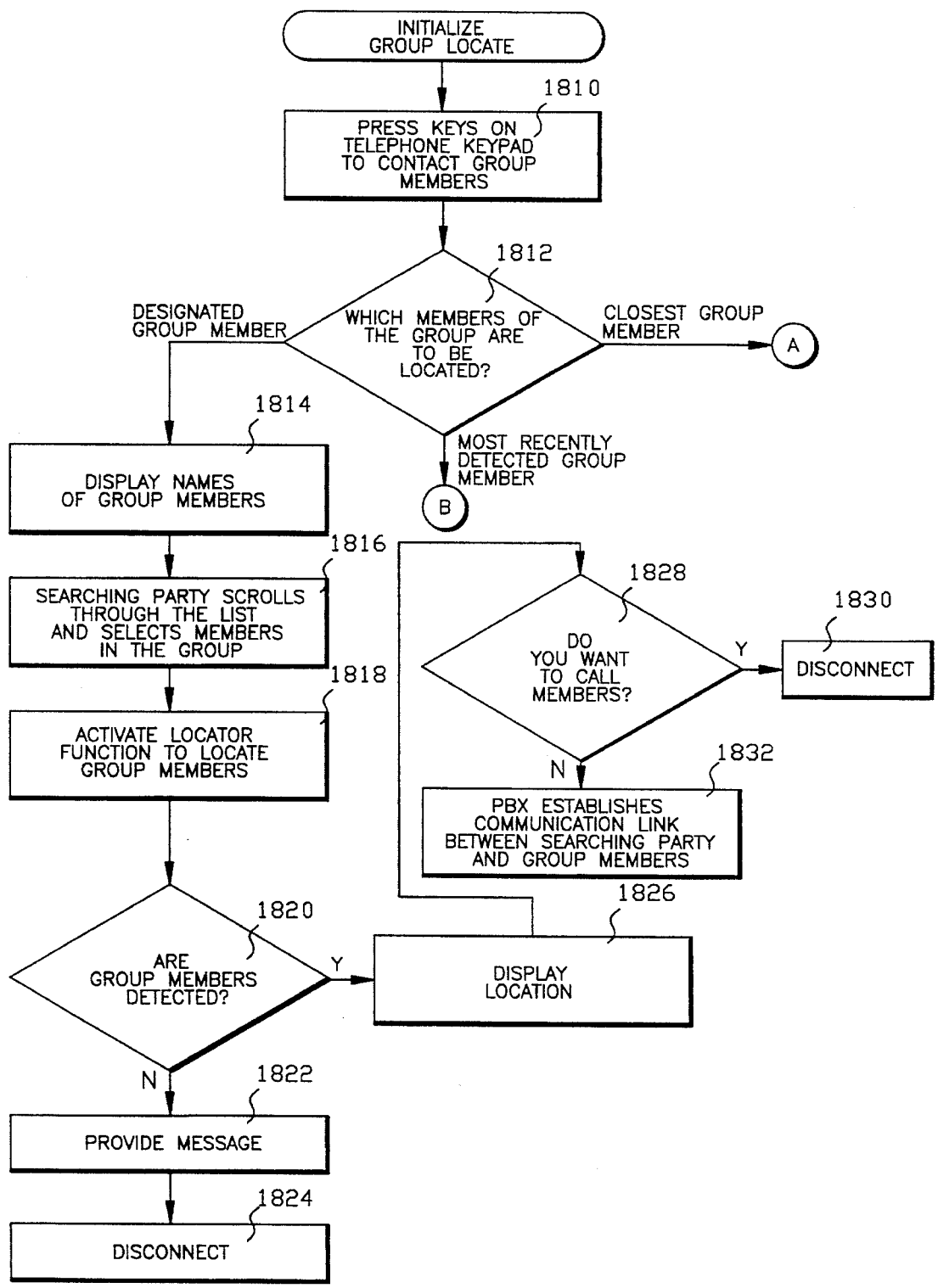
FIGS. 23, 23A and 23B are flow-chart diagrams for the group locate function according to the present invention.
Figure 23A:
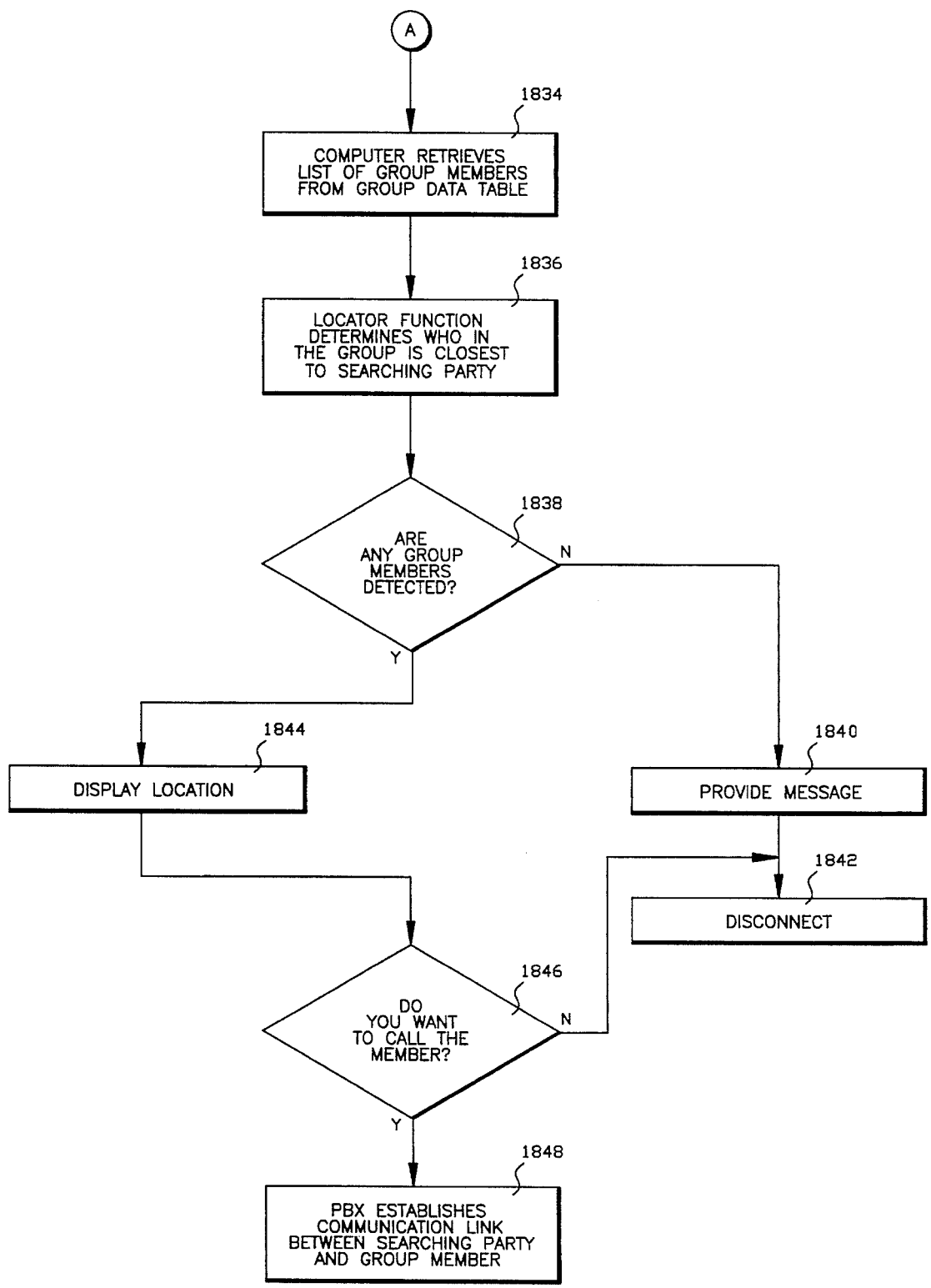
Figure 23B:
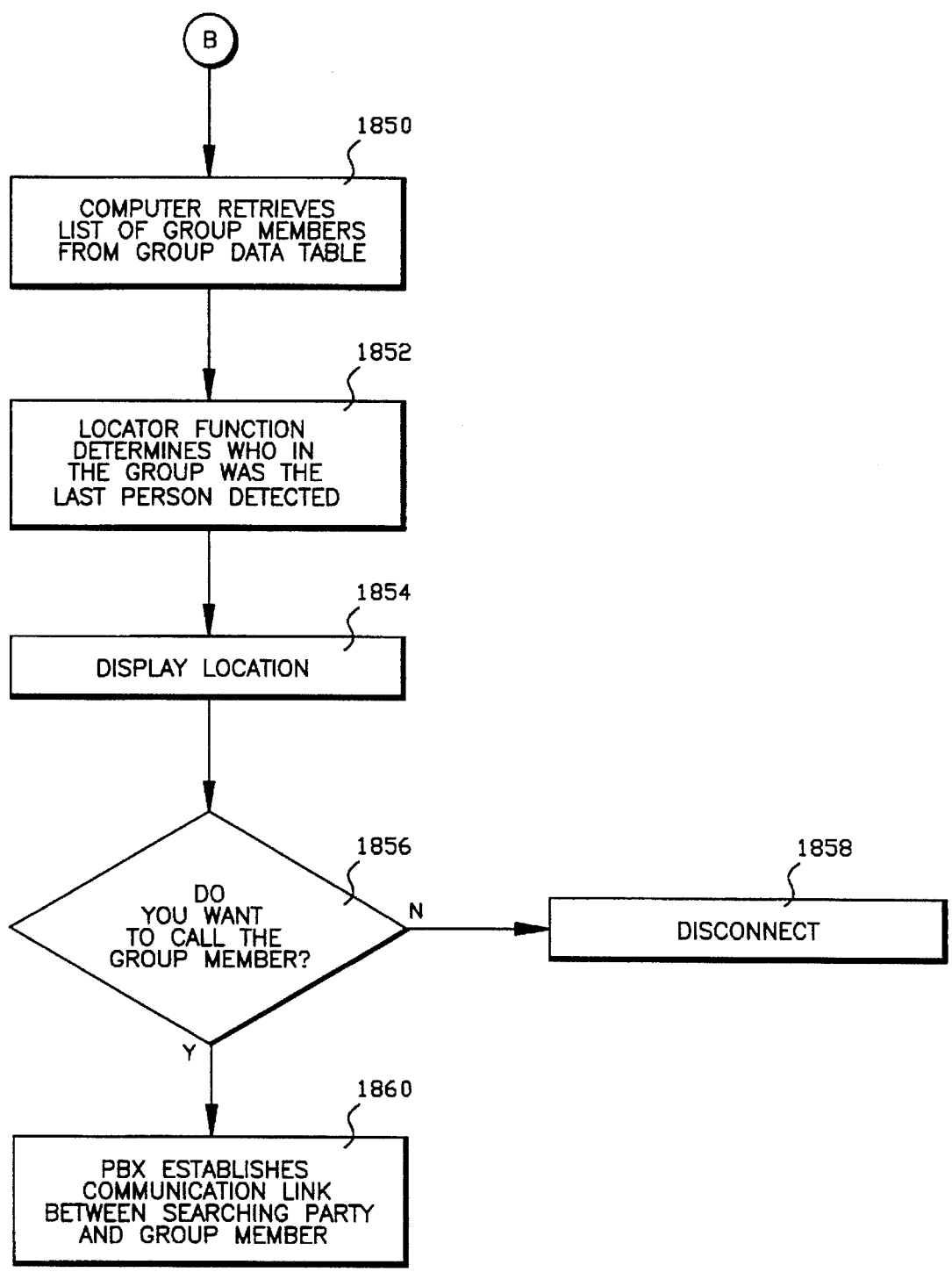

FIGS. 23, 23A and 23B illustrate an exemplary flow-chart diagram for the group locating function. To activate the group locating function, the searching party presses either a single soft key or a series of soft keys, which provides computer 20 with the identity of the searching party as well as the group of interest (step 1810). The searching party is then queried about which members of the group are to be located (step 1812). The options of group members to be located may include, for example, a designated number of group members, the group member closest to the location of the searching party, or the group member most recently detected by the location function.

When the designated number of group members function is selected, the computer 20 retrieves the names of the group members from the group data table and displays them on the display of the searching party's telephone (step 1814). If the display has a single line display, then the searching party can scroll through the names by pressing a designated scroll soft key. While scrolling through the list, the searching party can select the name of one group member or a number of group members whose location is to be determined (step 1816). Once the group member is selected, computer 20 activates the locator function to determine the location of the group member (step 1818). If the selected group member is not detected by the locator function, then a message is displayed on the searching party's telephone that the group member was not detected. The connection between the calling party's telephone and the PBX is then disconnected (step 1824). If the group member is available, the location of the group member is displayed on the searching party's telephone display (steps 1820 and 1826).

After the location of the group member is displayed, the searching party may be queried regarding whether or not to call the group member (step 1828). If the searching party does not want to call the group member, the communication link to the PBX is disconnected (step 1830). If the searching party does want to call the group member, PBX 10 establishes a communication link between the searching party's telephone and a telephone nearest the detected location of the group member (step 1832).

Returning to step 1812, when the closest group member option is selected, computer 20 retrieves the names of the group members from the group data table (step 1834). The locator function then determines which group members have been detected (step 1836). If no members of the group are detected, a member not detected message is displayed on the searching party's telephone display (steps 1838 and 1840). The communication link between the searching party's telephone and the PBX is then disconnected (step 1842). If group members are available, the location of the member closest to the location of the searching party is displayed on the searching party's telephone display (steps 1838 and 1844). Thereafter, the searching party may be queried to call the group member (step 1846). If the searching party does not want to call the group member, the PBX communication link to the searching party's telephone is disconnected (step 1842). If the searching party wants to call the group member, PBX 10 establishes a communication link between the searching party's telephone and the telephone closest the detected location of the group member (step 1848).

Returning again to step 1812, upon selection of the most recently detected group member option, computer 20 retrieves the names of the group members from the group data table and determines which group member was the last person detected by the locator function (steps 1850 and 1852). The location of the last group member detected is displayed on the searching party's telephone display (step 1854). Once the location of the group member is displayed, the searching party is queried to call the group member (step 1856). If no call is desired, the PBX communication link to the searching party's telephone is disconnected (step 1858). If a call is desired, PBX 10 establishes a communication link between the searching party's telephone and the telephone nearest the detected location of the group member (step 1860).

Do Not Disturb Function

In some instances, persons who are detected by the locator function may not want to be disturbed. To achieve such capabilities, the party desiring privacy could provide the computer 20 with a do-not-disturb (DND) instruction. Activation of the do-not-disturb function inhibits computer 20 or private branch exchange 10 from establishing a communication link with the located individual. Options are provided to the user to invoke station specific DND or global DND. For example, the #, 3, 6 entries on the keypad of a telephone may signal a station specific DND, which blocks any call connections to the user's telephone extension. For global DND, the user may enter #, 3, 7 which blocks any locator system routed calls to any telephone determined to be closest to the requested user.

The DND command may also be input from badge unit 18. As described above, each badge unit 18 includes transmitters and receivers to provide bidirectional data communications with the PBX 10 and ultimately computer 20, and a select button or keypad which generate data for transmission from the badge unit to the PBX 10. To send a do not disturb instruction to computer 20, the individual seeking privacy may enter from keypad 526, shown in FIG. 8, badge data which includes instructions to computer 20 to include in the personnel available data table a do not disturb (DND) field for that individual.

The DND function may also be a preassigned code that was previously imprinted in the smart card 320 (FIG. 5), which is transmitted via connector 324 to the badge unit 18. It is understood by one skilled in the art that other commands and locator functions may similarly be input to the system from the smart cards and badges.

Upon activation of the DND command by the user, the PBX 10 attaches a DND flag to the user's allocated memory area and the flag is checked by the PBX prior to the establishment of a call connection.

To provide the calling party with an indication that the DND function has been activated by the called party, an audible or visual message may be generated by PBX 10 and provided to the searching party's telephone. For example, a special DND ring tone is sent to the searching party's telephone. An example of a DND tone ring is two long tones.

Unavailable Party And Busy Signal Functions

Figure 24:
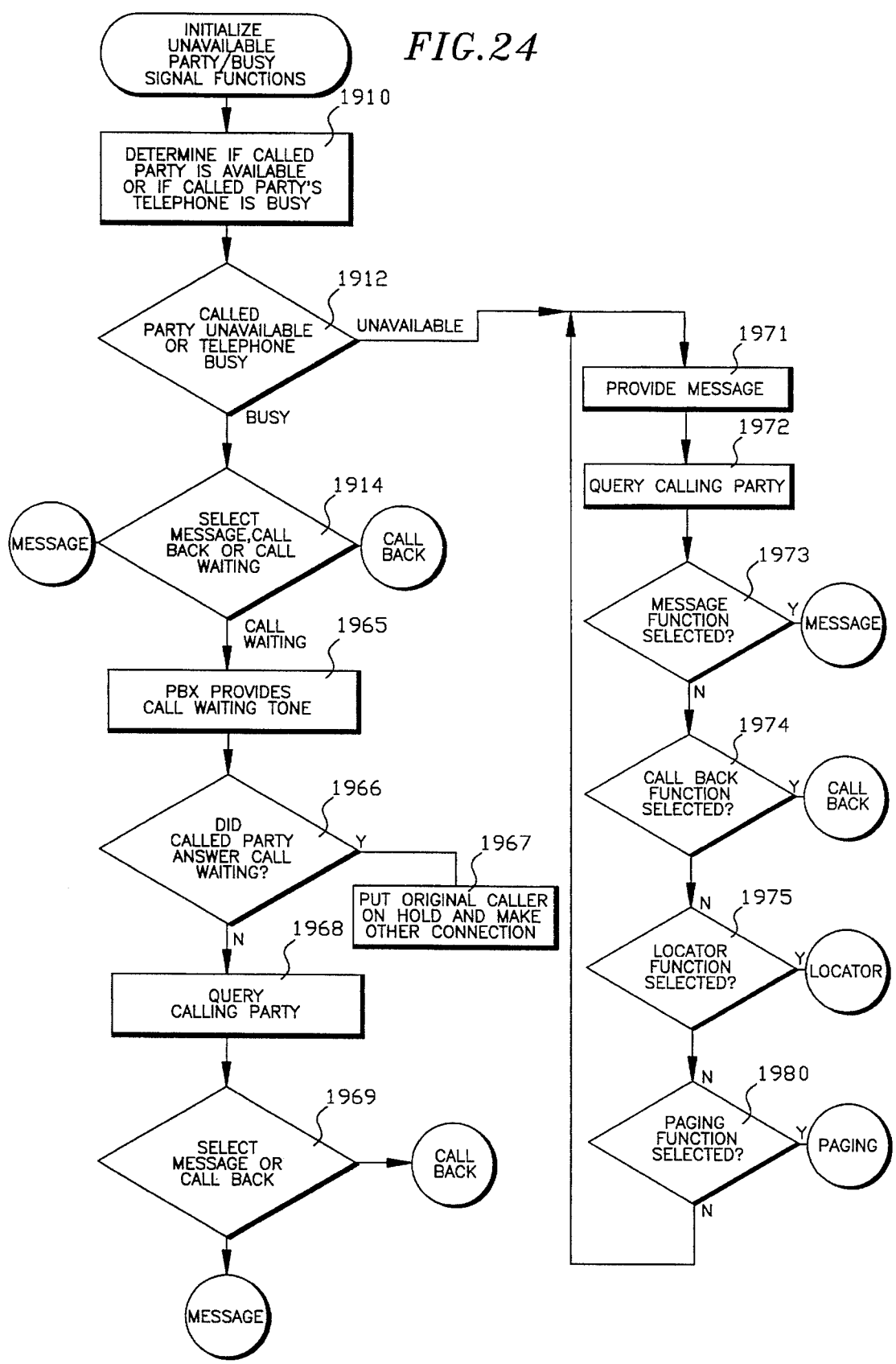
FIGS. 24, 24A, 24B, 24C and 24D are flow-chart diagrams for implementing party unavailable and extension busy functions for the system of the present invention.

FIG. 24 illustrates an example of the optional flow for providing messages to individuals who are unavailable or whose telephones are busy. An unavailable individual is defined as an individual who is not located by the locator system, or does not answer an incoming call or who has activated the DND function. Initially, when a calling party calls the extension of a particular individual, the PBX 10 and/or computer 20 determines whether no one is available to answer the call or that the extension of the called party is busy or a DND function has been activated (step 1910). The PBX provides a message to the calling party that the called party is unavailable or that the extension is busy (step 1912) and provides instructions to the calling party to press particular keys on the telephone keypad if the calling party wants to leave a message, to have the called party return the call (i.e., call back), or to activate a call waiting function (step 1914).

Figure 24A:
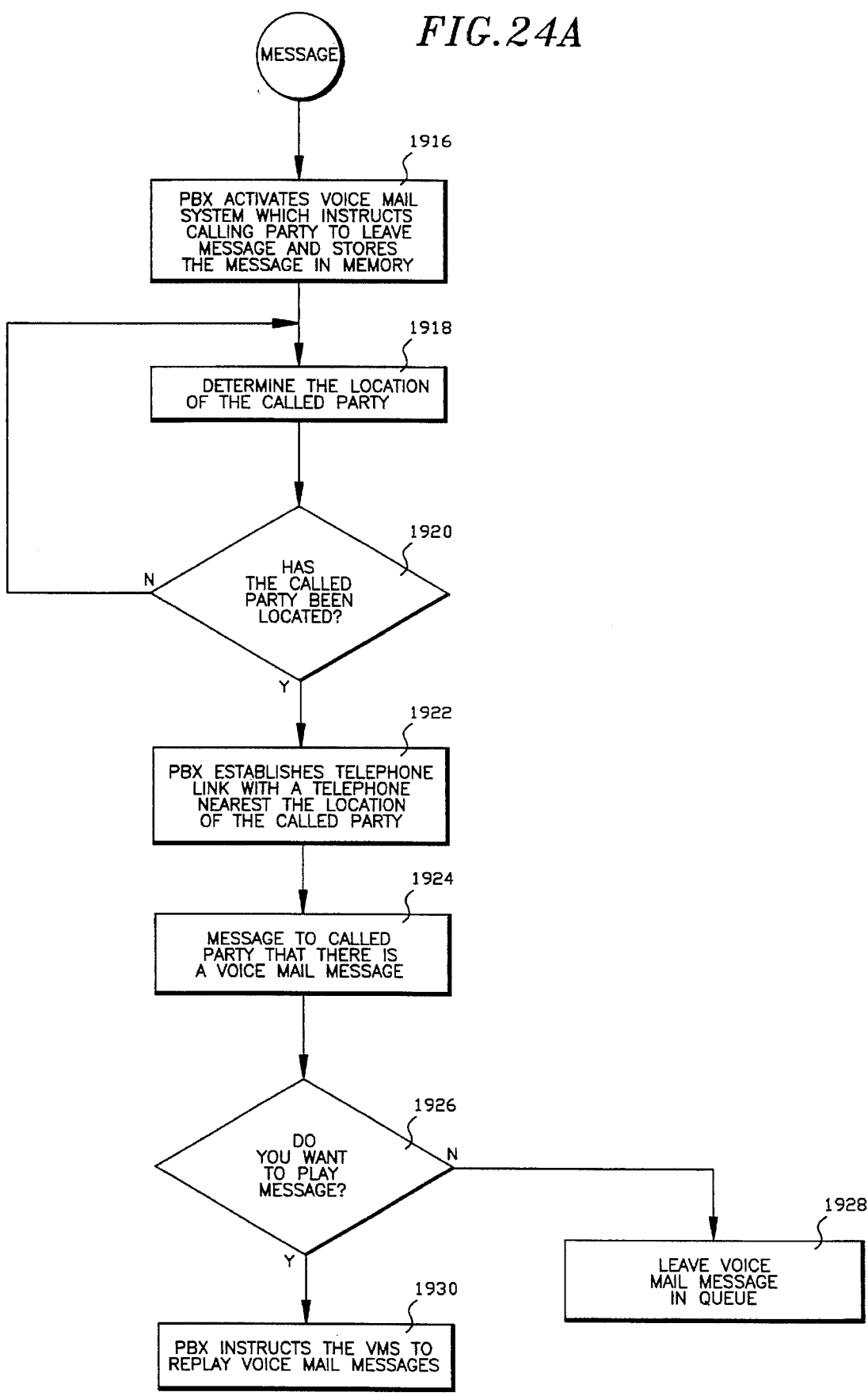

In response to the selection of the "message" function, PBX 10 activates a voice mail function which instructs the calling party to leave a message after a particular tone (step 1916 shown in FIG. 24A) and stores the message. Such voice mail functions are known and commercially available.

Further 'message' features may include message forwarding, in which the PBX searches the location data table to determine the location of the called party (step 1918). If the location of the called party cannot be ascertained, computer 20 monitors the location data table for the return or identification of the called party from incoming transceiver messages (steps 1918 and 1920). When the location of the called party is ascertained, PBX 10 establishes a telephone connection with a telephone nearest the location of the called party (step 1922), and plays an audio message that the called party has a voice mail message (step 1924). Preferably, when the telephone connection is established with a telephone nearest the location of the called party, a locating function ring tone which is different from a standard telephone ring tone is generated at the telephone nearest the called party. The locating function ring tone provides the called party with an audible indication that the telephone connection was established by the locator function. An example of a locator function ring tone is a short tone followed by a long tone.

In addition to providing an audible message to the called party at a telephone, a message could be transmitted to the called party's badge unit 18 using the above described data transmission techniques. The message received by the badge unit may be displayed on display 528, shown in FIG. 8, or the message may be broadcast over speaker 530, shown in FIG. 8. The called party may respond to the calling party, by sending a presaved message (i.e., a "canned message"). To send the canned message, the called party may press the select button 522, a single key or a sequence of keys on the badge unit keypad 526, which instructs microcontroller 510 to retrieve the saved message from memory and transmit the message to computer 20.

Additional features associated with the voice mail function of the present invention include, for example, a message confidentiality feature which prevents messages identified as confidential from being broadcast over either the telephone speaker or the badge unit speaker. Another feature is a priority message feature which notifies the called party of priority messages only.

Returning to FIG. 24A, PBX 10 then queries the called party as to whether the voice mail message is to be replayed (step 1926). If the called party does not want to replay the voice mail message, the message is maintained in the voice mail memory queue for later retrieval by the called party (steps 1926 and 1928). If the called party elects to replay the voice mail messages, the PBX 10 instructs the voice mail function to replay the message (steps 1926 and 1930).

Figure 24B:
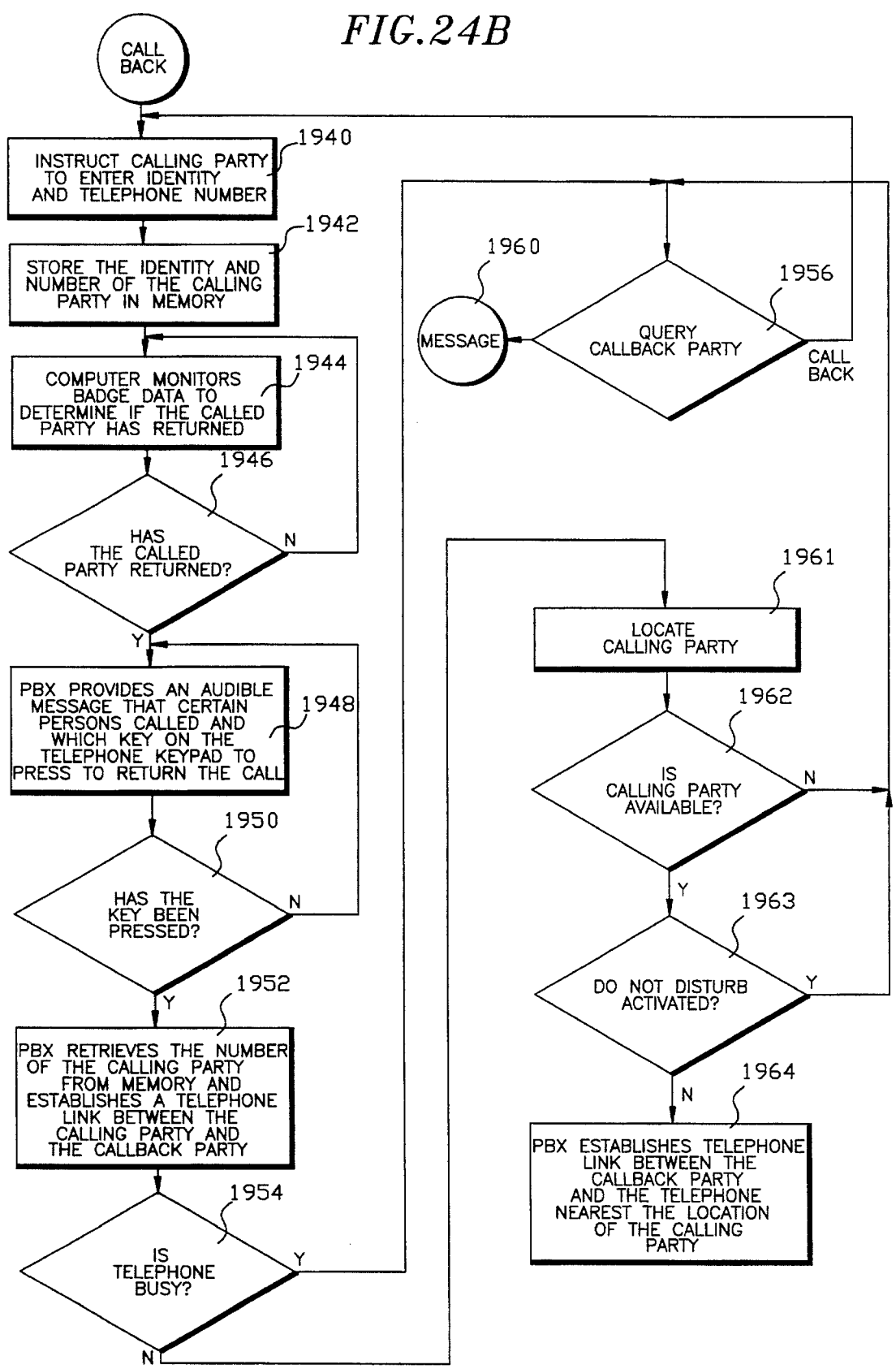

Returning to step 1914 in FIG. 24 and referring to FIG. 24B, if the calling party selects the "call back" function in response to the PBX's query, the PBX 10 prompts the calling party to enter his identity (e.g., ID number or name) or telephone number (step 1940). The entered information is stored in the locator memory in a call back data table (step 1942). PBX 10 monitors the called party's telephone to determine if the line is no longer busy. If the called party's telephone is no longer busy, or if the PBX 10 determines that the called party is away from his designated telephone, the PBX monitors incoming badge data for the return of the called party to locate the called party (steps 1944 and 1946). When the called party is located, the PBX 10 provides an audible message to the telephone nearest the detected location of the called party, that the called party received a call. In addition, the PBX 10 instructs the called party to press a key on the telephone keypad to return the call (steps 1948 and 1950). The call back data table may include more than one calling party who has selected the "call back" function. Thus, different keys on the telephone keypad may represent the different calling parties stored in the call back data table. In this instance, the called party would be instructed to select one of the keys. If the called party presses the key, the PBX 10 retrieves the telephone number of the calling party from memory and establishes a telephone connection between the calling party and the callback party (step 1952).

In instances in which the calling party is no longer at their designated telephone when the callback party returns the call, the locator function is activated to determine the location of the calling party. When the calling party is located, PBX 10 establishes a telephone connection between the calling party and the calling party at the detected location.

Preferably, when the telephone connection is established, a call back ring tone is generated at the telephone nearest the called party. The call back ring tone provides the called party with an audible indication that the telephone connection was established by the locator function and that the "call back" function was activated. An example of a call back ring tone is two short tones followed by a long tone.

Continuing to refer to FIG. 24B, PBX 10 then determines if the telephone of the calling party is busy (step 1954). If the telephone is busy, computer queries the callback party to select either the "call back" function or to select the "message" function (step 1956). If the "call back" function is selected, the "call back" function described above is performed (step 1940). If the "message" function is selected the "message" function described above with respect to FIG. 24A is performed (step 1960).

Returning to step 1954, if the calling party's telephone is not busy, computer 20 retrieves the location of the calling party from memory (step 1961) and determines if the calling party is available (step 1962). If the calling party is unavailable, then the computer queries the callback party to select between the "call back" and "message" functions (steps 1956). The PBX 10 also determines if the DND function has been activated (step 1963). If the DND function has been activated, then the PBX queries the callback party to select between the "call back" and "message" functions (step 1956). If the DND function has not been activated, the PBX establishes a telephone connection between the called party and the telephone nearest the location of the calling party (step 1964).

Returning to step 1914 in FIG. 24, if the calling party selects the "call waiting" function, PBX 10 forwards a call waiting tone to the called party (step 1965). PBX 10 monitors the called party's telephone to determine if the called party has responded to the call waiting tone (step 1966). If the called party responds to the call waiting tone the original caller is put on hold and the telephone connection between the calling party and the called party is established (step 1967). If the called party does not respond to the call waiting tone for a predetermined duration, PBX 10 queries the calling party to select either the "message" or "call back" function (steps 1968 and 1969). If the "message"
function is selected, the message function shown in FIG. 24A and described above is performed. If the "call back" function is performed, the call back function shown in FIG. 24B and described above is performed.

Returning to step 1912 in FIG. 24, if computer 20 determines that the called party is unavailable, the computer provides a message to the calling party that the called party is unavailable (step 1971). Computer 20 also queries the calling party to select between the "message", "call back", "locator" and "paging" functions to either leave a message for the called party or to establish telephone communications with the called party (step 1972). If the "message" function is selected, the "message" function described above is performed (step 1973). If the "call back" function is selected, the "call back" function described above is performed (1974).

Figure 24C:
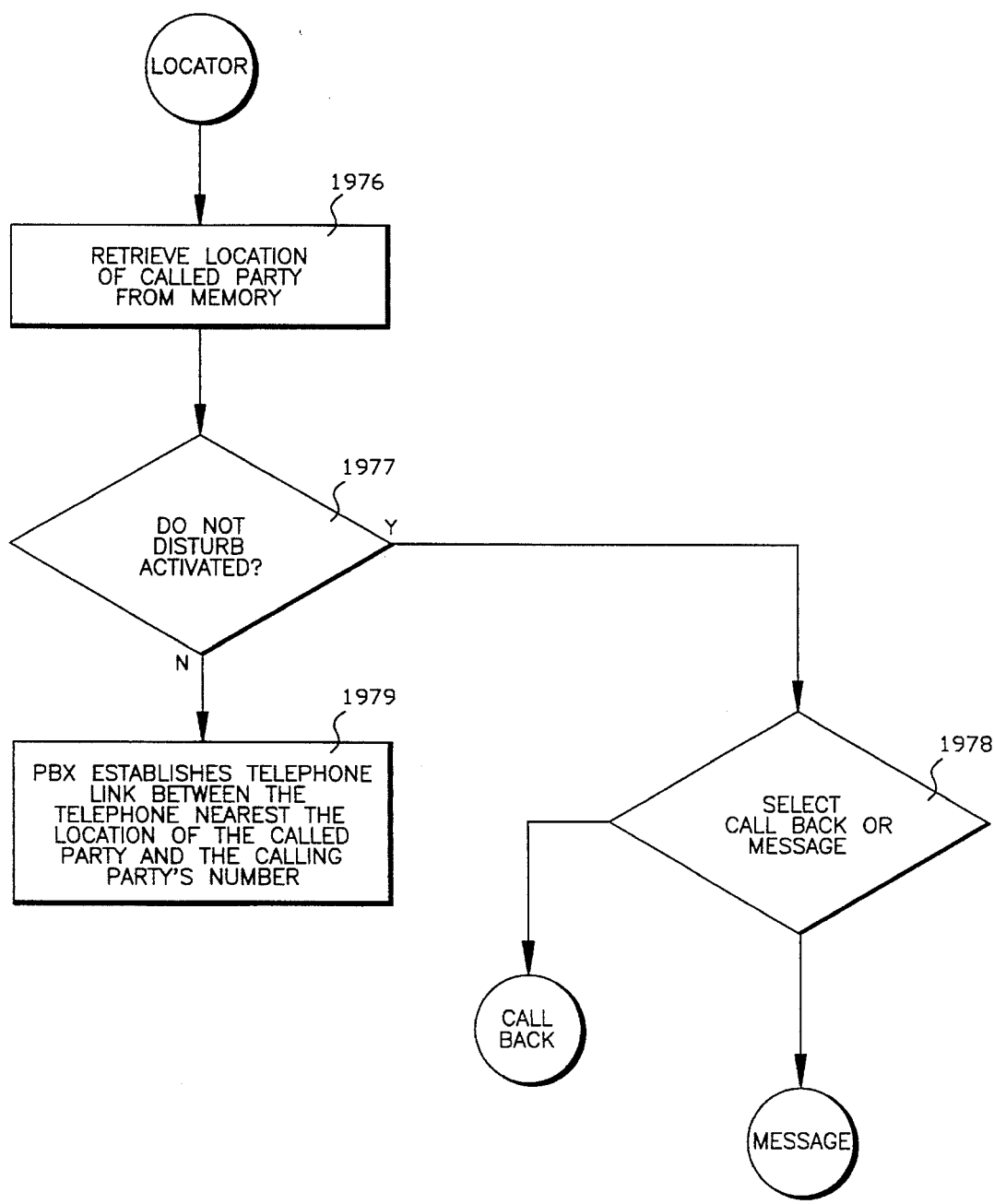

If the calling party selects the "locator" function in response to the query, the computer 20 retrieves the location of the called party from memory (steps 1975 and 1976 shown in FIG. 24C). Computer 20 then determines whether the called party has activated the do not disturb (DND) function (step 1977). If the DND function has been activated, computer 20 provides the caller with a message or a special tone that the called party does not want to be disturbed and instructs the caller to select either the "call back" or "message" function (step 1978). If the do not disturb function has not been activated, the PBX establishes a telephone connection between the telephone of the searching party and the telephone nearest the location of the called party (step 1979).

If the calling party selects the "paging" function (step 1980) in response to the computer's query, computer 20 initially determines whether a "forced locator" function has been activated (step 1981). The "forced locator" function is user programmable and is provided to minimize the number of pages broadcasted in the closed environment and to minimize the number of disturbances to individuals within the environment. The "forced locator" function requires the calling party to activate the locator function to contact the called party prior to any paging of the called party. Therefore, if the "forced locator" function is activated, computer 20 performs the "locator" function. As described above, the computer 20 retrieves the location of the called party from memory (step 1982) and determines whether the DND function has been activated (step 1983). If the DND function has been activated, the computer 20 queries the calling party to select between the "call back" function and the "message" function, and performs the selected function (step 1984). If the DND function has not been activated, the PBX 10 to establish a telephone link between the telephone nearest the detected location of the called party and the calling party's telephone (step 1985).

After the telephone link is established, PBX 10 monitors the telephones to determine if the called party has answered the telephone (step 1986). If the called party has not answered the telephone or if the "forced locator" function is not active, computer 20 queries the calling party to select either a general page, a specific area page, or a badge unit page (step 1987). If a general page is selected, computer 20 instructs the PBX 10 to establish a communication link to a plurality of speakers located throughout the closed environment (step 1988). The speakers include broadcast speakers positioned in public locations, e.g., hallways, as well as telephone speakers on each individual telephone in the closed environment. Once the communication link to the speakers is established, the calling party may broadcast a desired paging message (step 1989).

Figure 24D:
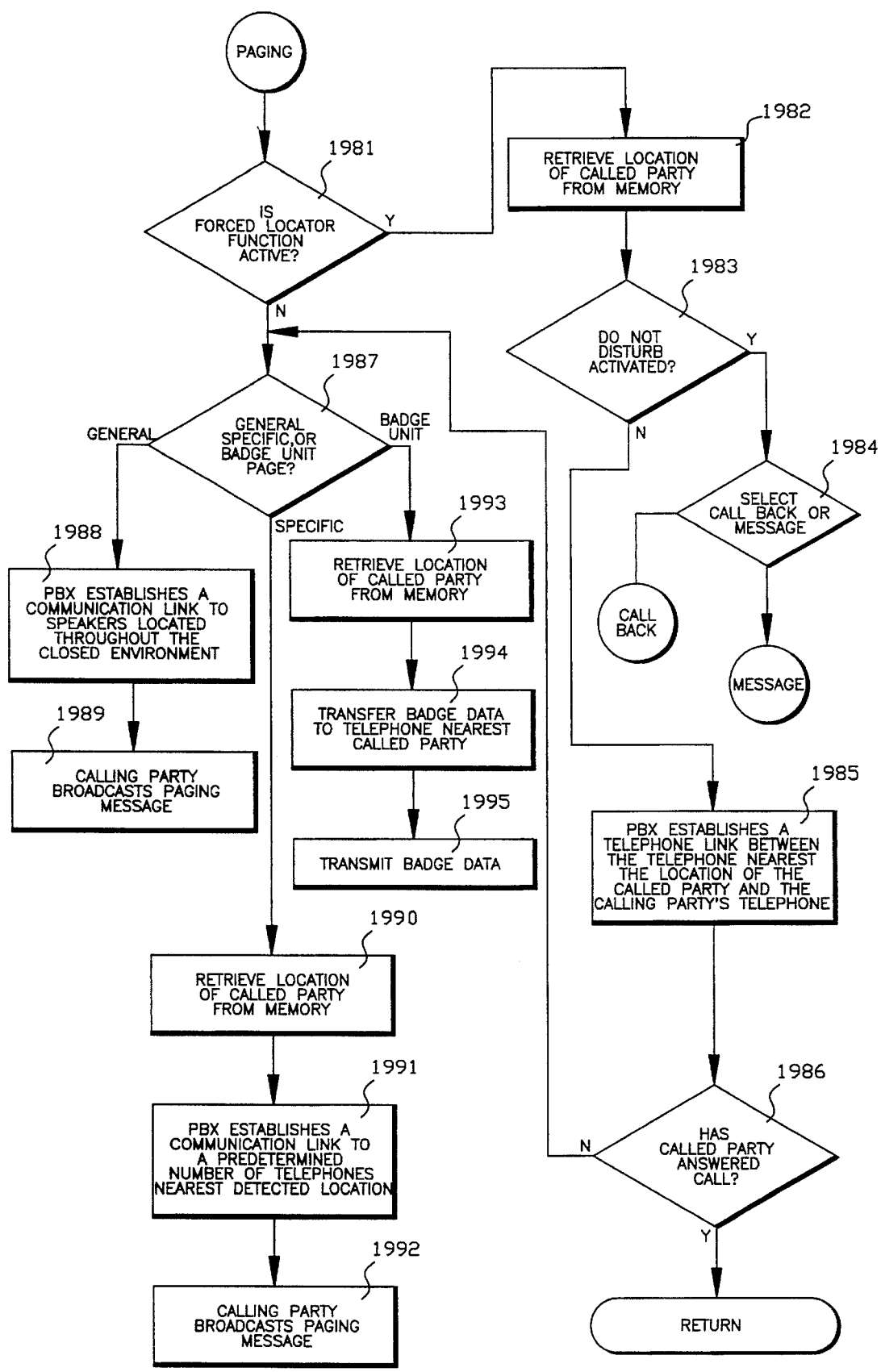

Continuing to refer to FIG. 24D, if a specific page is selected, e.g., paging an area by pressing on a telephone keypad 8, 0 and the extension of the telephone in that area, computer 20 retrieves the location of the called party from memory (step 1990) and instructs the PBX 10 to establish a communication link to a predetermined number of speakers nearest the detected location of the called party (step 1991). Once the communication link is established, the calling party may broadcast a desired paging message (step 1992).

If the badge unit page is selected, computer 20 retrieves the location of the called party from memory (step 1993). Computer 20 then instructs PBX 10 to transfer a paging message to a telephone or transceiver 24 (shown in FIG. 19) nearest the detected location of the called party (step 1994). The telephone or transceiver 24 transmits the paging message to the badge unit 18 of the called party (step 1995). The paging message may include, for example, the name and telephone number of the calling party. Once the badge unit 18 receives the paging message, the badge unit displays the message on display 528 (shown in FIG. 4).

Speed Dialing

A speed location function permits a person to store preselected search parameters and/or command data in assigned memory for speedy activation. Alternatively, the searching party may store a listing of individuals who are in the closed environment, e.g., telephone numbers of the employees frequently contacted. This listing is similar to an electronic rolodex and upon depressing predefined soft keys, the searching party is permitted to scroll through the rolodex to find the name of the searched party. When the name of the searched party is found, the searching party may depress a soft key to enter the search parameters automatically.

Call Screening Functions

The telephone system according to the present invention also includes call screening capabilities. The "call screening" function utilizes a call screening data table stored in the memory of the computer 20 or the PBX 10, to permit each individual assigned to a telephone to screen their incoming telephone calls to individuals identified in the data table. In addition, the "call screening" function prevents the calling party from utilizing the locator function unless the called party's name or other identifying information is stored in the call screening data table. Preferably, the "call screening" function is user activated so that each individual in the closed environment has the option to activate or deactivate this function.

Initially, each individual associated with a telephone extension generates the call screening data table which preferably contains the names of individuals they will speak to. When the PBX 10 receives a call for a particular individual, i.e., the called party, computer 20 determines if the called party has previously activated the "call screening" function.

If the "call screening" function is active, computer 20 determines if the incoming call is from within the closed environment or if the incoming call is from outside the closed environment (step 2510). If the call is from inside the closed environment, computer 20 retrieves the call screening data table associated with the called party (steps 2515 and 2520). The identity of the calling party is compared to the identity information (e.g., the name or employee number) within the call screening data table (step 2525) and the computer determines if the calling party's identity is in the call screening data table (step 2530). If the calling party's identity is in the data table, a telephone connection is established with the called party's telephone (step 2535). Computer 20 may then simply allow the called party's telephone to ring or may perform another system function. For example, the computer may perform the unavailable party/busy signal functions described above with respect to FIG. 24 (step 2540). If the calling party's identity is not in the call screening data table, the calling party is then instructed to select a system function which permits the calling party to leave a message for the called party. For example, the computer may instruct the calling party to select between the "call back" and the "message" functions described above (step 2545).

Figure 25:
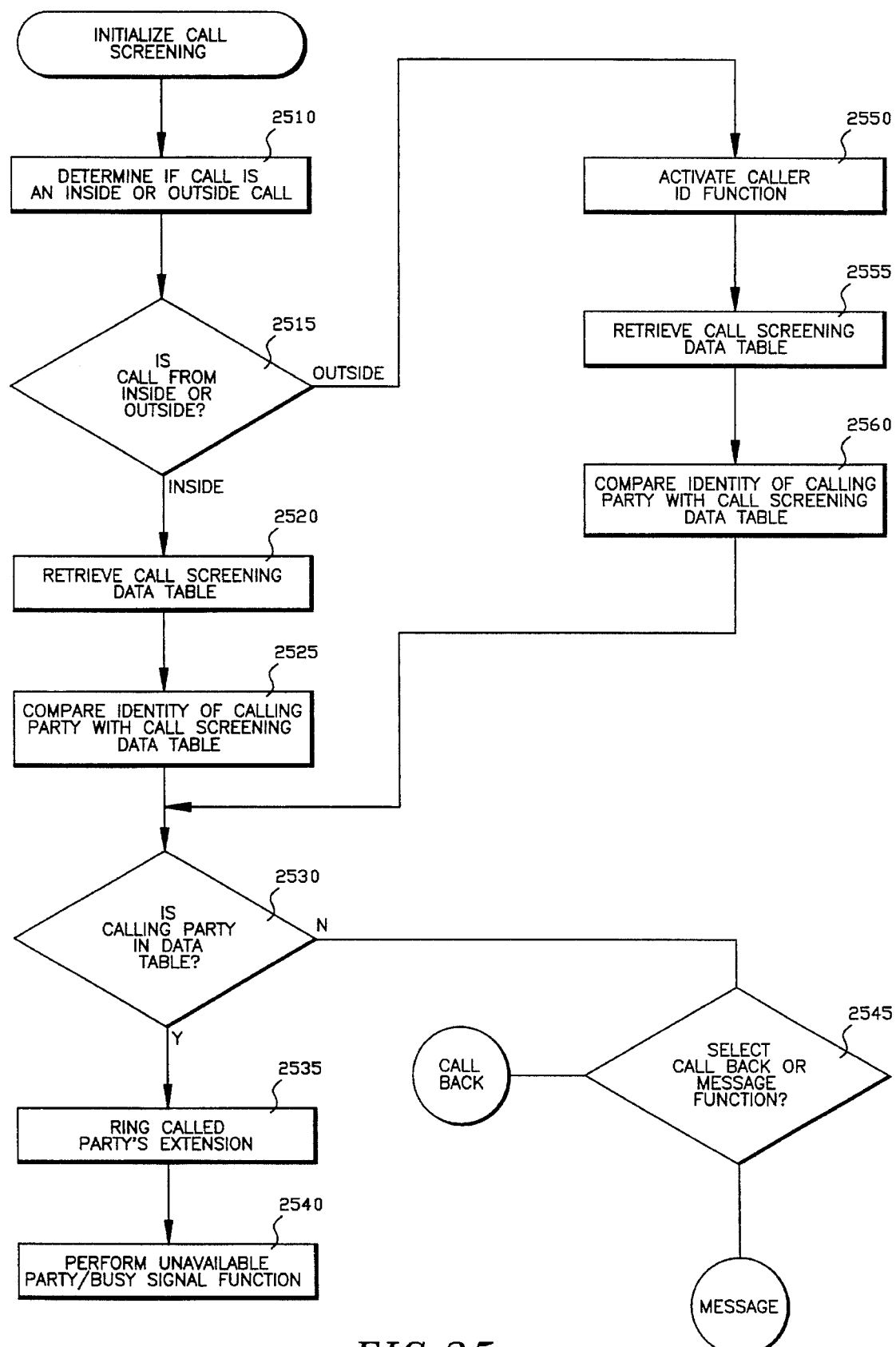
FIG. 25 is a flow-chart diagram for implementing a call screening function for the system of the present invention.

Returning to step 2515 in FIG. 25, if the incoming call is from outside the closed environment, computer 20 activates caller identification hardware and associated programs to determine the identity of the calling party (step 2550). Caller identification information is provided by the telephone central office. The information is usually embedded between the ringing signals from the central office. The process of extracting the caller ID information is well known to one skilled in the art.

Once the identity of the calling party is ascertained, the computer 20 retrieves the call screening data table from memory (step 2555) and determines whether the calling party's identity is in the data table (step 2560). If the calling party's identity is in the data table, a telephone connection is established with the called party's telephone (step 2535) and then performs, for example, the unavailable party/busy signal functions (steps 2540). If the calling party's identity is not in the call screening data table, the calling party is then instructed to select a system function which permits the calling party to leave a message (step 2545).

Secretary Tracking Function

Another function which may be implemented with the present invention is a "secretary tracking" function. The "secretary tracking" function permits an individual, i.e., the called party, to have incoming calls routed to their secretary, whether or not the called party (or individual) is in the closed environment. The "secretary tracking" function may be automatically activated or selectively activated by the called party.

Figure 26:
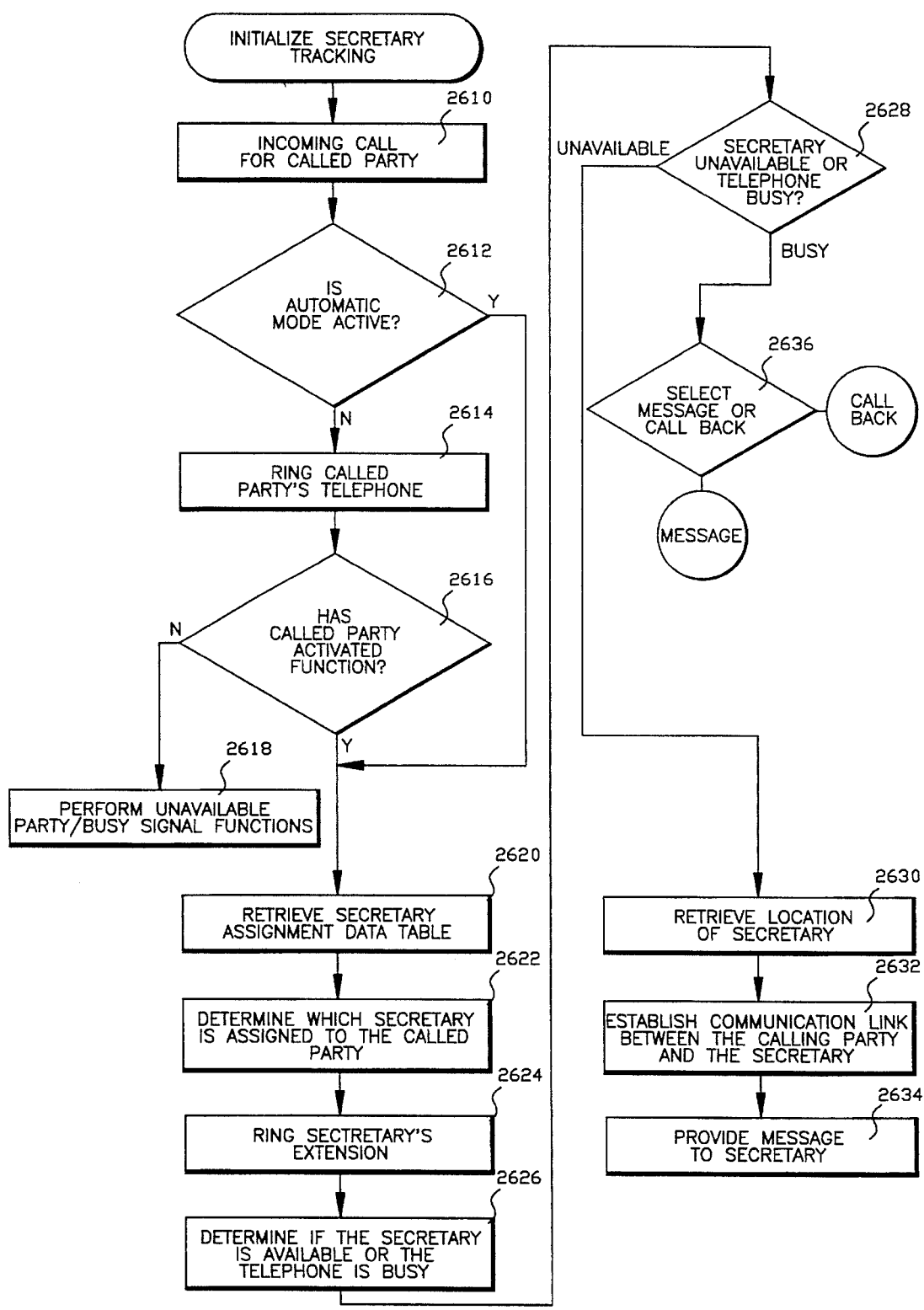
FIG. 26 is a flow-chart diagram for implementing a secretary tracking function for the system of the present invention.

FIG. 26 illustrates an exemplary flow chart diagram for implementing the "secretary tracking" function. Initially, a secretary assignment data table is generated and stored in the memory of the computer 20. The secretary assignment data table includes the names (or other form of identity, e.g., employee number) of the secretaries in the closed environment and the names (or other form of identity) of the individuals who they are assigned to.

Once the PBX 10 determines who an incoming call is for (step 2610), the computer 20 determines whether the "secretary tracking" function for the called party is in the automatic mode (step 2612). Preferably, the automatic mode is triggered when either the called party does not answer the incoming call, the locator function cannot determine the location of the called party, or the called party has activated the DND function. If the "secretary tracking" function is not in the automatic mode, computer 20 instructs the PBX 10 to establish a telephone connection with the called party's telephone (step 2614). PBX 10 monitors the called party's telephone to determine if the called party has activated the "secretary tracking" function (step 2616). Typically, the called party can activate the "secretary tracking" function, when the telephone is ringing, by pressing a single function (soft) key or a sequence of function keys on the telephone keypad. If the "secretary tracking" function is not activated then the "unavailable party" and "busy signal" functions described above with respect to FIG. 24, are performed (step 2618).

If the "secretary tracking" function is activated or if the "secretary tracking" function is in the automatic mode, computer 20 retrieves the secretary assignment data table from memory (steps 2612, 2616 and 2620) and determines which secretary is assigned to the called party (step 2622). Computer 20 then instructs the PBX 10 to establish a telephone connection with the telephone assigned to the secretary (step 2624) and determines if the secretary is available or if the telephone is busy (step 2626). If the secretary is unavailable, computer 20 retrieves the location of the secretary from memory (steps 2628 and 2630). Once the location of the secretary is ascertained, the computer 20 instructs the PBX 10 to establish a telephone connection between the calling party and a telephone nearest the detected location of the secretary (step 2632). Preferably, when the connection is established, a message is displayed or broadcasted by the telephone nearest the detected location of the secretary, that the call is for the called party (step 2634). Alternatively, a secretary tracking ring tone may be generated at the telephone nearest the detected location of the secretary. The secretary tracking ring tone provides the secretary with an audible indication that the incoming telephone call was initiated by the "secretary tracking" function.

Returning to step 2628 in FIG. 26, if the secretary's telephone is busy, computer 20 queries the calling party to select between the "message" and "call back" functions as described above (step 2636).

Operator Locator Functions

Typically, telephone systems used in the closed environments noted above include an operator station or receptionist area which permits a single individual to manage numerous incoming telephone calls, as well as attend to paging and other functions for individuals within the closed environment. The operator station typically has a telephone terminal which provides an operator with a telephone communication connection with the PBX and a display terminal which provides the operator with audio and/or visual indications relating to the telephone system. In one embodiment, the operator station has a plurality of function keys and a plurality of associated indicators which illuminate to notify, for example, the operator that the person is using a particular telephone extension. In an alternative embodiment, the operator station may include a monitor which identifies the telephone system status. FIG. 2 illustrates an operator station 22 connected to the PBX 10 to provide such capabilities.

In one configuration, data stored within the location data table is extracted by computer 20 to generate an individual available data table which contains the identity of individuals who have been detected, i.e., individuals who are available in the closed environment. As noted above, the location of each available person is continuously updated to provide real-time location data for each individual, as well as a continuously updated log of which individuals are available. The individual available data table is then transferred to the operator station 22 to provide the operator with a listing of who is available. In one embodiment, indicators on the operator station may be illuminated to identify that a particular person is "in" or "out". For example, an amber indicator may be illuminated to indicate that a particular person is "in", and a red indicator may be illuminated to indicate that a particular person is "out". In an alternative embodiment, the operator station may include a monitor which displays the listing. As noted, the listing is continuously updated to provide a real-time indication of which individuals are available.

However, each previously detected location for each individual may be stored in, for example, a location history data table. Thus, an operator may retrieve a listing of locations where each individual has been over a predetermined time period, e.g., 24 hours. Alternatively, the operator could determine which individuals have been in a particular location for a predetermined time period. These listings are then displayed on the operator station display. One skilled in the art would recognize that once a location history data table is established, individuals would be able to extract such history data from their telephones and display the information on the telephone display 650.

As described above, instances occur where individuals do not want to be disturbed. If an individual has provided a DND instruction to the computer 20, the computer will provide an indication at the operator station 22 that the party being sought does not want to be disturbed. In the embodiment where indicators are used to identify if a particular individual is available, the DND field may be indicated by utilizing a different color indicator which represents that the person is in but is not to be disturbed. Alternatively, a flashing indicator may be utilized to indicate the DND field. In the embodiment where the operator station 22 has a monitor, the display may simply include the "DND" field for the individual seeking privacy. In addition, a DND tone may be broadcast at the operator station 22 to indicate that a particular individual does not want to be disturbed.

Figure 27:
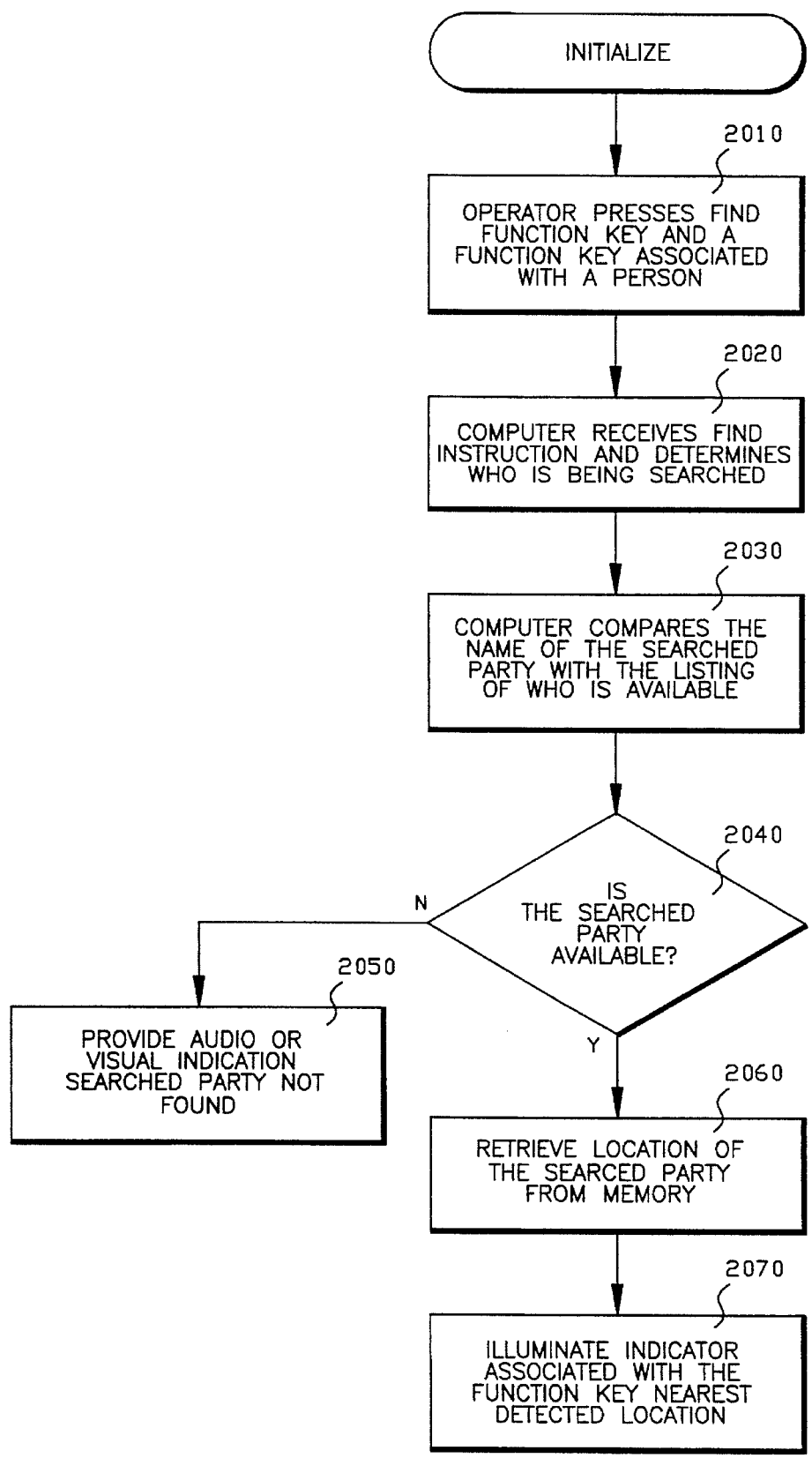
FIG. 27 is a flow-chart diagram for the operator find function according to the present invention.

Another operator function for the present invention is a "find" function which permits the operator to determine the location of a particular individual from the operator station 22. The following is a description of the "find" function implemented with the various operator station configurations described hereinabove. FIG. 27 illustrates an exemplary flow-diagram of the "find" function for the embodiment where the operator station includes a plurality of function keys, including, for example, a "find" function key, and an associated plurality of indicators.

To actuate the "find" function, the operator presses the "find" function key and a function key associated with the particular individual (step 2010). In response, computer 20 receives the "find" instruction, determines who is being searched, and determines if the searched party is available by comparing the searched party identity with the individual available data table (steps 2020 and 2030). If the searched party is not available (i.e., the searched party is not in the individual available data table), then computer 20 provides the operator station 22 with either an audio or visual indication that the searched party is not available (steps 2040 and 2050). If the searched party is available, computer 20 retrieves from the location data table the location of the searched party (steps 2040 and 2060), and illuminates the indicators associated with the function key nearest the detected location of the searched party (step 2070). Thus, providing the operator with a visual indication of the location of the searched party.

Another operator function is a room look-up function which permits the operator to determine the identity of individuals in a particular room or location. For example, the operator can press the find function key followed by the room number. Computer 20 will then determine the identity of each person in the room using the locator function and provide the operator with a visual indication of who is in the room.

In addition to permitting an operator to locate individuals within the closed environment, the system of the present invention may also be configured to permit the operator to transfer calls to the detected location of the searched party, as well as actuate the voice mail function to respond to a telephone call to searched party.

Another operator function for the present invention is a tracking function which permits the operator to track individuals within the closed environment. As noted above, the location data table is continuously updated. That is, the location data table is updated on a periodic or aperiodic basis. This real-time location capability permits the operator to track the location of individuals within the environment. To illustrate, if the operator station 22 includes a monitor, the computer 20 can continuously update the individual available data table and refresh the listing displayed on the monitor.

Automated Operator

Figure 28:
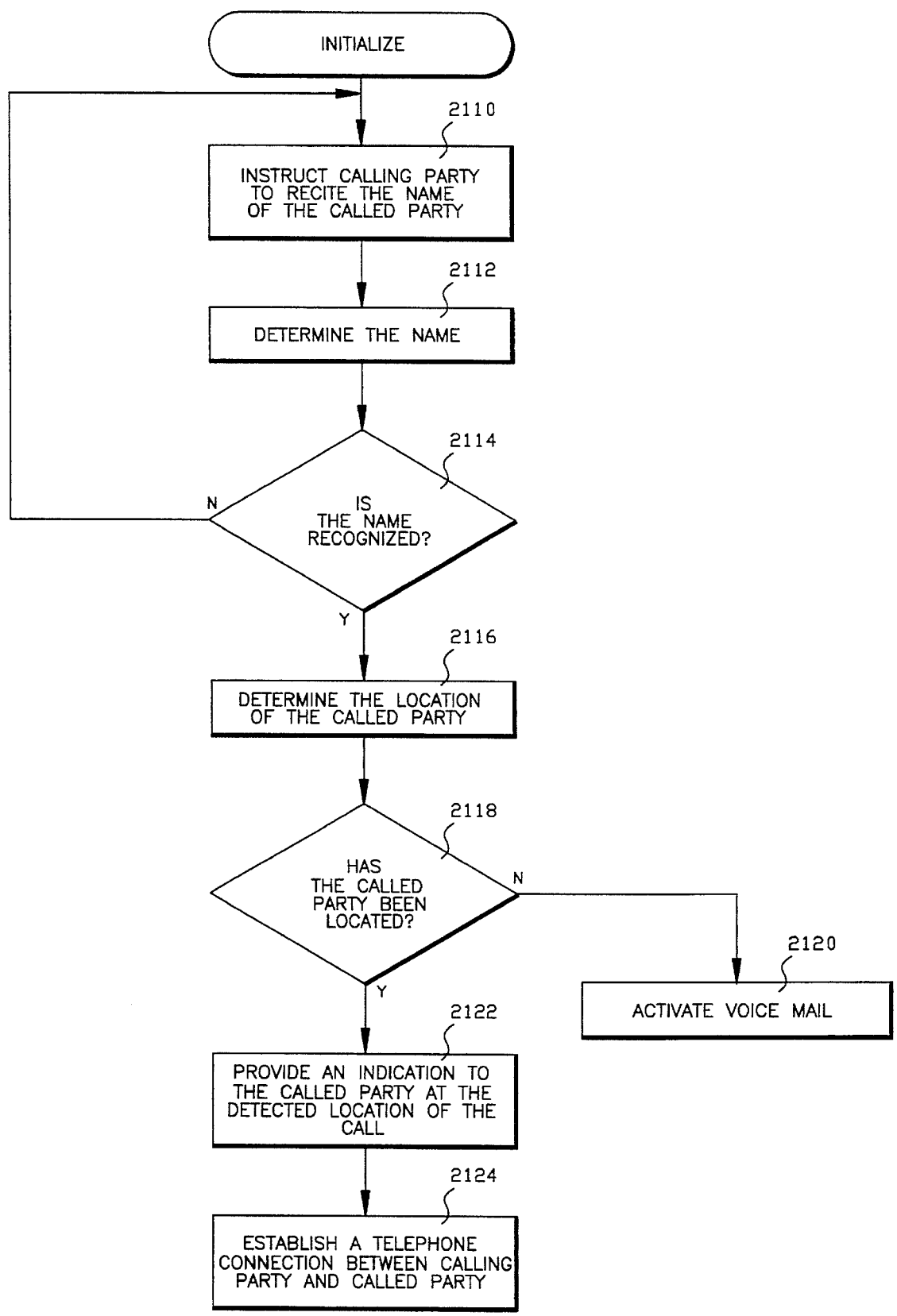
FIG. 28 is a flow-chart diagram for the locator function implementing a voice recognition function for responding to telephone calls.

In this embodiment, the operator station 22 is an automated operator which answers telephone calls and if necessary, responds to voice commands or keypad entries from the calling party to manage the telephone calls. For example, by prompting the calling party to answer yes or no or input the names of the called individuals. FIG. 28 illustrates an exemplary flow diagram for implementing the automated operator function. The automated operator answers the call and instructs the calling party to recite the name of the called party (step 2110). A voice recognition circuit (not shown) or a DTMF decoder processes the received name of the called party and determines whether the name is recognized (step 2112). If the name is not recognized, the calling party is again instructed to recite the name of the called party (step 2114). If the name is recognized, computer 20 determines the location of the called party using the locator function (step 2116). If the called party has not been located, the voice mail function may be activated to permit the calling party to leave a message (step 2120). If the called party is located, computer 20 instructs PBX 10 to provide an indication at the telephone nearest the detected location of the called party of the call (step 2122). Preferably, the PBX 10 provides an audible indication to the called party. Thereafter, computer 20 instructs the PBX 10 to establish a telephone connection between the calling party and the called party (step 2124). Alternatively, computer 20 may transmit badge data to the badge unit 18 associated with the called party, which includes a message that the called party has a telephone call.

Home Phone Function

FIG. 19 illustrates infrared transceivers 24 disposed in rooms and hallways. In certain environments, such as office environments, space is often divided into cubicles wherein each cubicle is used as individual offices with each individual having their own telephone and extension. In this cubicle arrangement, a single transceiver 24 may be disposed near the ceiling to serve multiple cubicles. As a result, when the locator function is implemented in such an arrangement, the locator transferred calls may be directed to a telephone designated as a main telephone for all persons in cubicles covered by the transceiver. This arrangement works well in most instances but may inconvenient other individuals assigned to that transceiver.

To avoid this inconvenience, the system of the present invention can be configured to provide a "home phone" function for each individual in each cubicle. The home telephone is preferably the telephone extension assigned to each individual. If the locator function determines that the called party is located at the home transceiver, computer 20 will direct the incoming call to the called party's home telephone and not to the telephone designated for the transceiver (the main phone). If the called party is not located near their home telephone, then computer 20 will direct the incoming call to the designated main telephone.

Ring When Alone Function

This function is used if a user prefers to minimize interruptions when she conducts conferences in her office. She selects the "ring when alone" feature by entering the designated function codes. When selected, the locator system is activated each time there is an incoming call to determine if she is alone in her office. Her telephone is not rung unless the locator determines that she is alone. An alternate global "ring when alone" function may also be selected. In the global function, the locator system prevents routing of a call to a located extension when she is away from her designated extension if the locator detects more than one person at the to-be-routed-to-telephone.

Station Reconfiguration Function

In some instances it is advantageous to have the capability to reconfigure operational functions of telephones during different periods of time. One such instance occurs when different individuals work different shifts but share a common telephone.

The station reconfiguration function according to the present invention utilizes the locator function to automatically reconfigure telephones when a single individual is detected. To illustrate, typically individuals in the closed environment have a telephone and associated extension number assigned to the telephone. Current telephones have the capability to permit the individual to configure functional soft keys to actuate predefined functions. For example, telephones may be programmed for speed dialing operation which permits an individual to dial commonly used telephone numbers by simply pressing one soft key.

Figure 29:
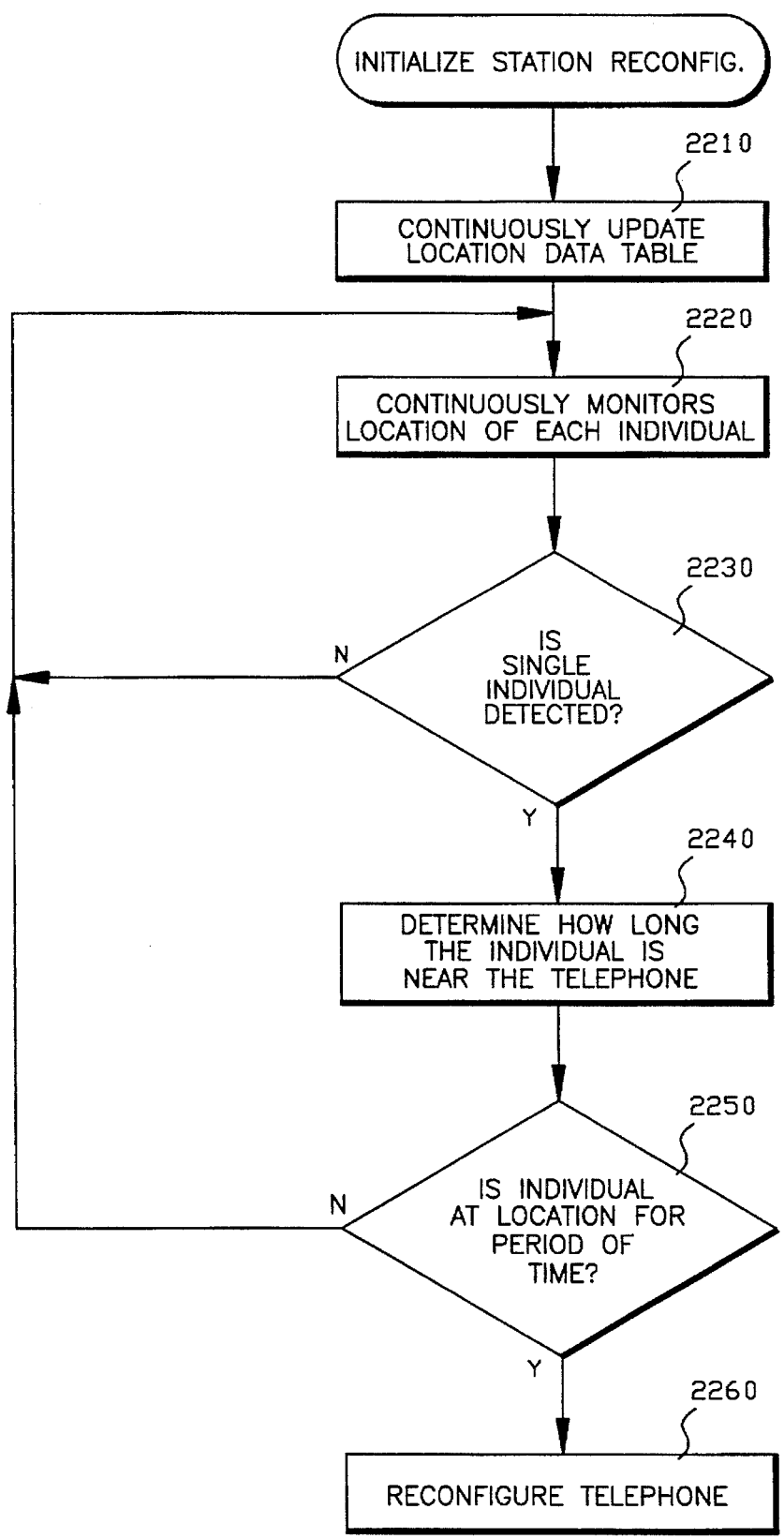
FIG. 29 is a flow-chart diagram for the station reconfigure function according to the present invention.

FIG. 29 illustrates an exemplary flow-chart of the station reconfiguration function according to the present invention. Initially, as noted above, the locator function continuously updates the location data table with the most recent location of each individual (step 2210). Computer 20 continuously monitors the location of each individual by monitoring the data in the location data table (step 2220), and determines whether a single individual is detected by a telephone. If a single individual is not detected, the computer returns to monitor the location of each individual (step 2230). If a single individual is detected, computer 20 determines how long the individual has been near the telephone (step 2240). If the individual is not at the detected location for a predetermined period of time, e.g., 10 minutes, the computer 20 returns to continuously monitor the location of each individual (step 2250). If the individual is detected at the telephone location for the predetermined period of time, then computer 20 reconfigures the telephone at the detected location and would treat that telephone extension as corresponding to the detected individual (step 2260).

Alternatively, an individual can manually reconfigure the operational functions of a telephone by either entering a code into the telephone keypad, or by pressing a single on the telephone and by pressing a key or a sequence of keys on keypad 526 of badge unit 18, shown in FIG. 4.

Automatic Call Cost Accounting

Another feature which may be implemented by the system of the present invention is an automatic call cost accounting function. The call cost accounting function correlates the cost of calls with different billable accounts. For example, if an attorney is in a conference room with a client, all calls, in particular long distance calls, made from the conference room would be billed to the client.

To implement this feature, the individual wearing the badge either presses a single key or a series of keys on the badge unit keypad to provide computer 20 with billing information, e.g., the client and the start time for billing the client. Thereafter, the locator function tracks the individual and any calls placed from any detected location of the individual will be attributed to the particular client.

Password Protection and Multi-Level Control

According to a preferred embodiment of the present invention, the telephone functions of the system may be password protected and can only be accessible or controllable upon entry of a preassigned password. For example, to prevent an automatic transfer of a telephone call by the locator system to a conference room telephone, which have previously been assigned as a password protected telephone, the PBX 10 prompts the calling telephone for a password and establishes a communication link between the calling telephone and the protected phone only upon receiving a matched password.

The telephone/locator system according to the invention may also be configured for multi-level usage. In such configuration, users of the system are categorized into different levels, for example, 1, 2 and 3, and a database of users assigned to each level is stored in the PBX 10. In use, the system may be configured to allow access or retrieval of location information of users only within or beneath the caller's own level, e.g., if level 1 is the highest level, a level 2 caller can only access location information of users in levels 2 and 3. In such system, the PBX 10 automatically retrieves the identifications and the assigned levels of the user initiating the search and the person being searched, matches the names to the list of names in the different levels, and activates the locator system only upon finding the calling person level being equal or higher level than the called person.

The facility employing the system of the present invention may also include password protected zones. In the specified protected zones, the entries of the zones are protected by automated locking devices which are opened only upon entry of the appropriate password. The password may be entered through a telephone at the entry or may be directly transmitted from the badge 18 to the transceiver assigned to the entry. In the badge embodiment having the smart card 320, the password may be imprinted in the card and the password is included in the badge transmission. Alternatively, the select button 522 of badge 18 may be depressed in a preassigned sequence to signal the badge to transmit the user password.

Programmable Logical Functions

According to another embodiment of the present invention, the PBX 10 includes storage of a programmable logical function module which allows certain users of the system to modify the operating configuration of the system. Generally, this is done by accessing the system controls and specifying logical conditions to be monitored by the sensors of the system. Upon occurrence of the specified conditions, the system is instructed to perform an output function.

Figure 30:
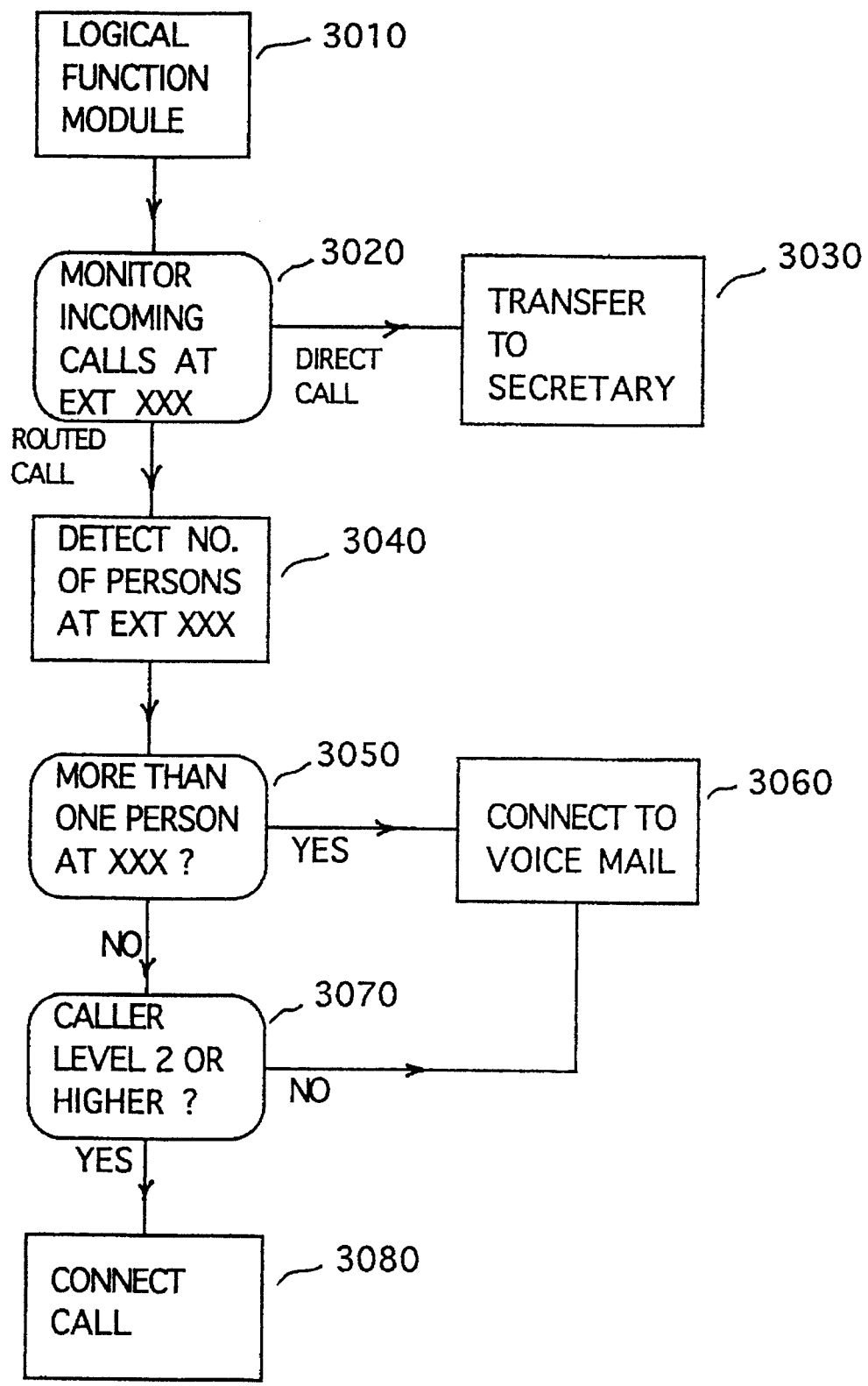
FIG. 30 is a flow-chart diagram for the programmable logic function according to the present invention.

The programmable logical function feature is preferably password protected and the module may be accessible by a personal computer (PC) link on any of the telephone hookups of the PBX system having an appropriate PC interface. Referring to FIG. 30, which shows an exemplary usage of the feature, the user accesses the module by appropriate password entries (3010) and specifies the sensors to be monitored, what conditions must be met and what output function(s) is to be performed upon occurrence of the specified conditions. For example, he may specify that his own extension be monitored (3020), and that any direct calls to his telephone that is not routed by the locator system to be automatically transferred to another back-up extension, such as a secretary's extension (3030). If a call is routed by the locator system, the user directs the locator to detect the number of persons in his room (3040). If the number is more than one person (3050), the call is directed to check the level of the caller (3070). The call or communication link is established or the telephone is rung only if the caller is designated as level 2 or higher (3080). If not, the call is directed to his voice mail (3060).

Another exemplary usage of the programmable logical function module may be to specify security zones which permits only cleared individuals to enter. In such configuration, the user designates the transceivers encompassing a secured area for monitoring by the PBX 10 and the persons or level of persons who may enter. The automatic locks disposed at the entries of the secured area are linked to the PBX 10, preferably through the respective transceivers. The PBX 10 will cause the lock to open at the location of the transceiver which detected a designated person. It is apparent to one skilled that the programmable logical function feature may be used to specify other mechanical or electrical devices connected to the telephone/locator system. For example, the user may control a thermostat to automatically adjust the temperature in his room dependant upon his presence in the room and/or the time of day.

It will be understood that various modifications can be made to the embodiments of the present invention herein disclosed without departing from the spirit and scope thereof. For example, various modifications may be made in the communication formats utilized to transmit data. Therefore, the above description should not be construed as limiting the invention but merely as exemplifications of preferred embodiments thereof. Those skilled in the art will envision other modifications within the scope and spirit of the present invention as defined by the claims appended hereto.

We claim:

1. A telephone communication system, comprising:
   (a) a private branch exchange (PBX) having a processing unit and a plurality of telephones for facilitating telephone communication between a plurality of telephone users; and
   (b) a locator system electrically connected to said PBX for providing location information, said locator system comprising:

a plurality of portable badges, each associated with a respective one of a plurality of telephone users and transmits badge information including an identification signal for identifying the telephone user associated with said respective badge; and a plurality of transceivers, each electrically connected to said PBX and each adapted for receiving said badge information transmitted from said badges and for electrically forwarding at least a portion of said badge information to said processing unit of said PBX to determine location information of said telephone users;

said PBX further having a memory for storing said location information and stored programs for implementing a plurality of telephone functions in conjunction with said location information; each of said telephones having a keypad for selectively accessing said locator system and said telephone functions, a data receiver for receiving location information from said PBX, and a display for displaying said location information received from said PBX upon access of said locator system from said keypad.

2. The system according to claim 1, wherein said transceivers are incorporated in said plurality of telephones whereby each of said plurality of telephones is configured to receive transmissions from said badges.

3. The system according to claim 1, wherein each of said badges includes means for housing a card having a memory for storing information and each of said badges includes means for receiving said stored information from said card.

4. The system according to claim 1, further including an operator station which includes a display for selectively displaying the location of each of said telephone users and for displaying all telephone users located at a specific location.

5. The system according to claim 1, wherein said telephone functions are accessible from one of said plurality of telephones after said data receiver of said one of said plurality of telephones has received location information from said locator system.

6. The system according to claim 1, further including an actuatable device connected to said PBX and is actuated by commands from said PBX, said commands are generated by said PBX based upon the occurrence of a plurality of predetermined conditions.

7. The system according to claim 1, wherein each of said plurality of telephones includes storage means for storing a plurality of telephone numbers for selection and use in conjunction with said locator system.

8. The system according to claim 1, wherein said telephone functions include a code representing a selection by a calling telephone user from a calling telephone to connect to a voice mail storage device of a called telephone user after said data receiver of said calling telephone has received location information from said locator system.

9. The system according to claim 1, wherein said telephone functions include a code representing a do-not-disturb (DND) function selectable by a user at one of said plurality of telephones assigned to said user by entering said code for instructing said PBX to not establish a communication link with another telephone upon determination of location of said user by said locator system at said one of said plurality of telephones assigned to said user.

10. The system according to claim 9, wherein said PBX sends said do-not-disturb code to said another telephone and said code is displayed on a display at said another telephone when said PBX is instructed to not establish a communication link based on said selection of said DND function.

11. The system according to claim 1, wherein said telephone functions include a global-do-not-disturb (GDND) function for blocking an incoming telephone call, said GDND function being selectable by a user for instructing said PBX to not establish a communication link between said incoming telephone call and a telephone determined by said locator system to be closest to said user.

12. The system according to claim 1, wherein said PBX includes means for causing a preset ring tone to ring at a called telephone when said called telephone is rung by said PBX based on a telephone number supplied from said locator system.

13. The system according to claim 1, wherein said telephone functions include a callback code representing an automatic call back feature selectable by a telephone user which automatically rings a telephone from which said callback code is selected and upon determination of the location of a searched person by said locator system.

14. The system according to claim 1, wherein said telephone functions include a callback code representing an automatic callback feature for selection by a calling user after detection by said PBX of an off-hook signal at a telephone called by said calling user for activating said locator system for locating said calling user and ringing a telephone determined by the locator system to be closest to said calling user upon detection of an on-hook signal at said called telephone by said PBX.

15. The system according to claim 1, wherein said telephone functions include an identify-personnel command selectable by a telephone user for calling a telephone and activating said locator system to determine the identity of all persons located within reception range of a transceiver associated with said called telephone.

16. The system according to claim 1, wherein at least one of said telephones further includes a memory for storing keypad entries and for facilitating speed redial by recalling said keypad entries from said memory.

17. The system according to claim 1, further including a paging system having a plurality of speakers for broadcasting an audio message over at least one of said speakers said paging system is connected to said PBX and is activated by a selection of a preassigned code from one of said telephones after said one of said telephones has received location information from said locator system.

18. The system according to claim 1, wherein each of said telephones includes means for configuring the keys on the telephone keypad to represent commands for activating the telephone functions; and each of said telephones is automatically reconfigured to commands specific to a user when said user is detected by said locator system to have been at a location closest to one of said telephones for more than a predetermined duration.

19. The system according to claim 1, wherein said locator system includes means for grouping each of said telephone users into one of a plurality of groups and said locator system includes means for locating all users belonging in a selected one of said groups and display means for displaying the locations of all users in said selected group.

20. The system according to claim 19, wherein each of said groups is classified into one of a plurality of levels and said locator system sends location information to a telephone only if a calling telephone user is determined to be at equal or higher level than a called telephone user.

21. The system according to claim 1, wherein said location information and said plurality of telephone functions are accessible from any of said telephones upon entry of one of a plurality of preassigned passwords at said any of said telephones.

22. A communication system for wireless communication of personal information including identification information between a plurality of telephones and a private-branch exchange, which comprises:

a private-branch exchange; and a plurality of telephones, each of said plurality of telephones having a wireless receiver located at least partially therein for receiving wireless transmitted data, including remote transmitter identification from a remote transmitting device, said plurality of telephones having a processor coupled to voice and data transmission and receiving circuitry to facilitate bidirectional telephone communication with said private-branch exchange to provide telephone communications between said plurality of telephones;

wherein information received from said remote transmitting device is transferred to said private-branch exchange by said voice and data transmission circuitry, and wherein said private-branch exchange processes said information received from said remote transmitting device to determine the location of an object or person associated with said remote transmitting device.

23. The system according to claim 22, wherein said private-branch exchange processing of said information received from said remote transmitting device includes a determination of the energy level of the information received from said remote transmitting device for rejecting received information having an energy level below a preset level.

* * * * *